(12) United States Patent  
Scheucher

(10) Patent No.: US 8,970,164 B2  
(45) Date of Patent: Mar. 3, 2015

(54) CORDLESS POWER SUPPLY

(76) Inventor: Karl Frederick Scheucher, Waite Hill, OH (US)

( * ) Notice: Subject to any disclaimer, the term of this patent is extended or adjusted under 35 U.S.C. 154(b) by 216 days.

(21) Appl. No.: 13/195,698

(22) Filed: Aug. 1, 2011

(65) Prior Publication Data

US 2011/0286168 A1 Nov. 24, 2011

Related U.S. Application Data

(63) Continuation of application No. 11/864,996, filed on Sep. 29, 2007, now Pat. No. 7,990,102.

(51) Int. Cl.  
*H02J 7/00* (2006.01)

(52) U.S. Cl.  
CPC ............. *H02J 7/0063* (2013.01); *H02J 7/0045* (2013.01)  
USPC .......................................... 320/107; 320/136

(58) Field of Classification Search  
USPC .......................... 320/107, 110, 134, 136, 163  
See application file for complete search history.

(56) References Cited

U.S. PATENT DOCUMENTS

| | | | | |
|---|---|---|---|---|
| 6,331,761 B1 * | 12/2001 | Kumar et al. | ................. | 320/132 |
| 6,381,156 B1 * | 4/2002 | Sakai et al. | .................... | 363/65 |
| 2006/0125448 A1 * | 6/2006 | Okui | ............................ | 320/138 |

* cited by examiner

*Primary Examiner* — Edward Tso  
*Assistant Examiner* — Aaron Piggush  
(74) *Attorney, Agent, or Firm* — Woodling, Krost and Rust

(57) ABSTRACT

A cordless power supply comprising a battery, a power conversion unit, a first standard coupling half permanently affixed to the power conversion unit and a second standard coupling half which reciprocally mates with the first standard coupling half is disclosed and claimed. The second standard coupling half includes a first interengaging half and a second interengaging half. The first interengaging half being standardly engageable with the first standard coupling half permanently affixed to the power conversion unit. The second interengaging half is interengageable with a specific battery. The battery may be a dual use cordless tool battery or an original equipment battery. Alternatively, a cordless power supply comprising an interchangeable adapter may be mounted on the power conversion unit for interconnection with a plurality of batteries. Alternatively, a cordless power supply comprising an adapter integral with the power conversion unit may be used with a specific battery type.

19 Claims, 27 Drawing Sheets

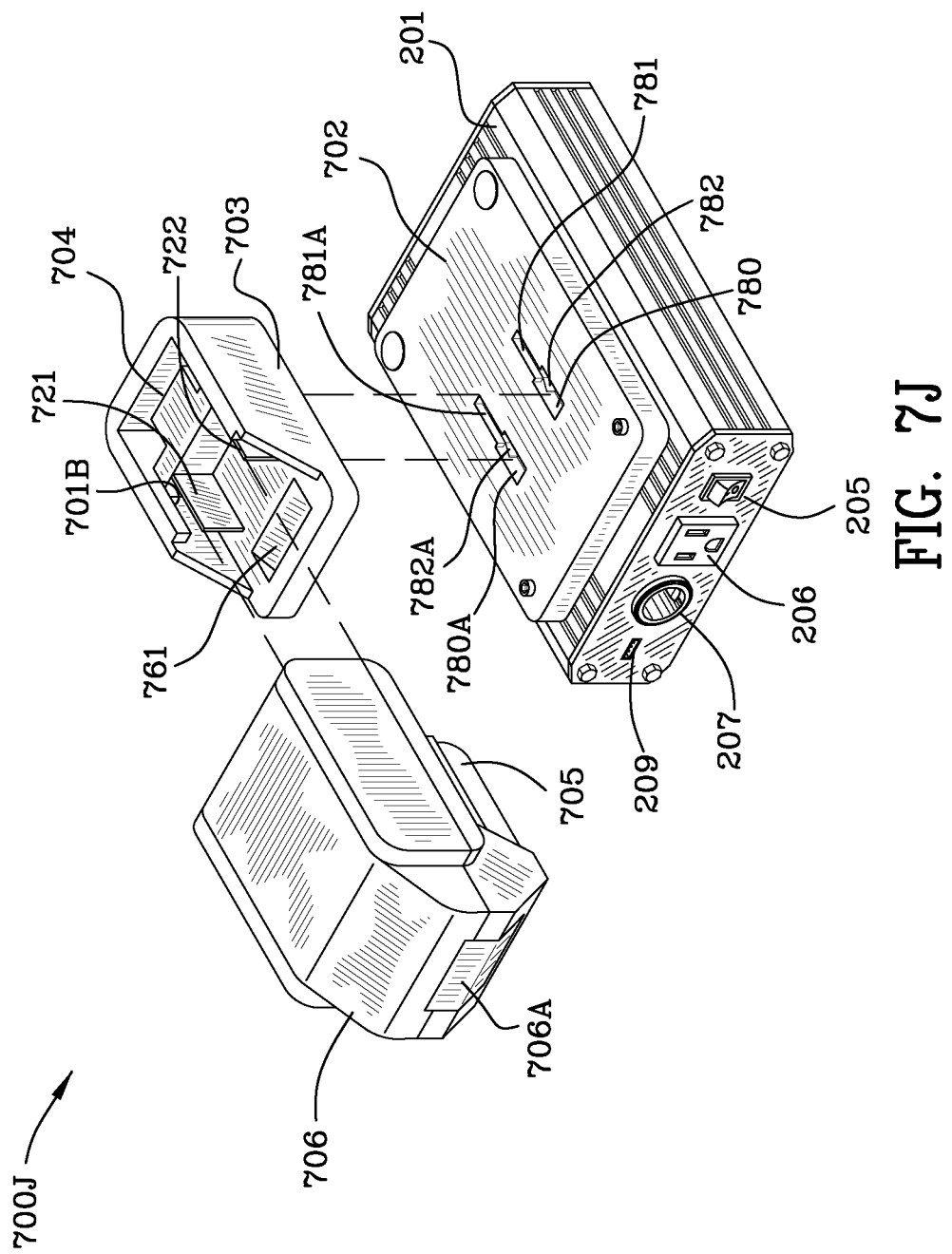

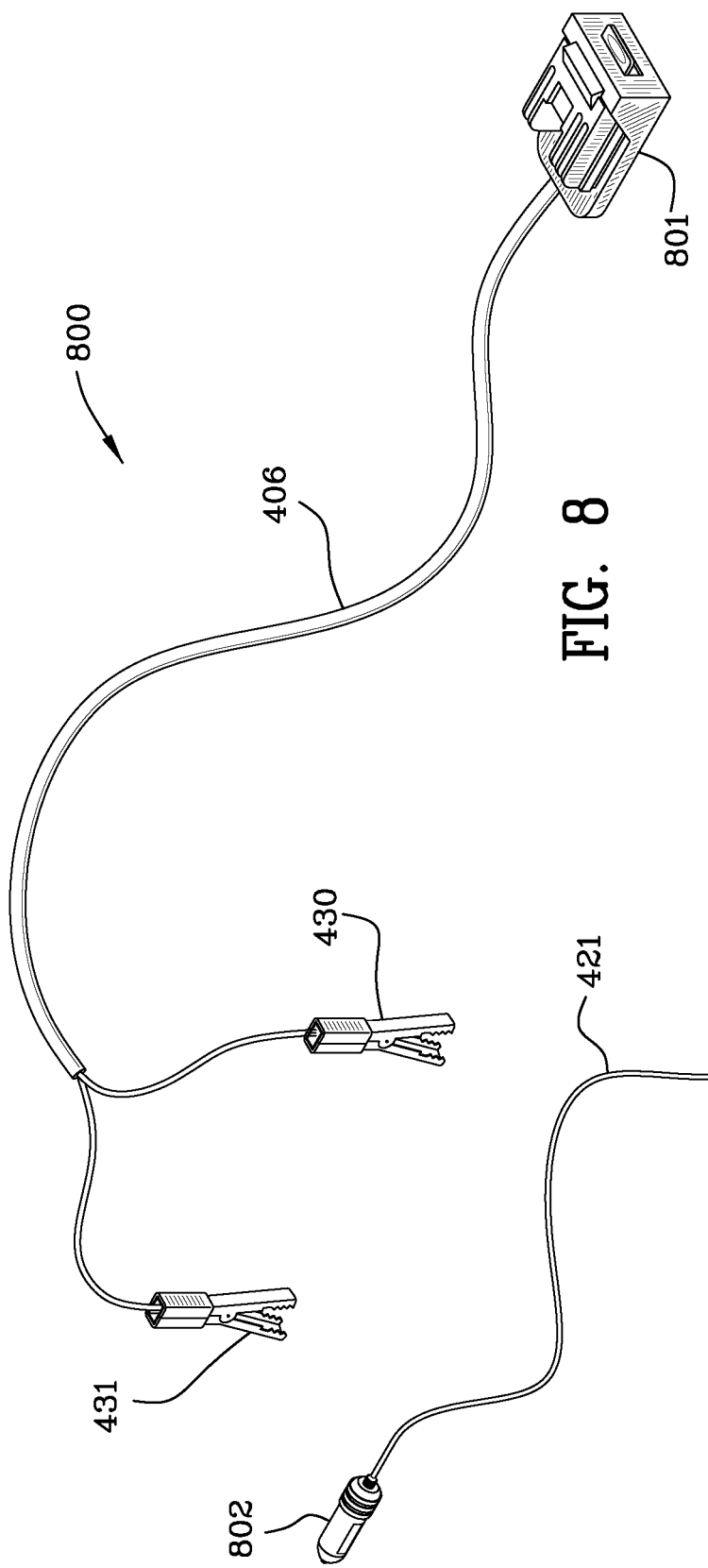

CORDLESS POWER SUPPLY

RELATED APPLICATIONS, PRIORITY CLAIMS AND INCORPORATION BY REFERENCE

Design patent application Ser. No. 29/266,852 filed Sep. 29, 2006, Design patent application Ser. No. 29/280,875 filed Jun. 8, 2007, U.S. patent application Ser. No. 11/672,853 filed Feb. 8, 2007, U.S. patent application Ser. No. 11/672,957 filed Feb. 8, 2007, U.S. patent application Ser. No. 11/673,551, filed Feb. 9, 2007, U.S. patent application Ser. No. 11/851,504, filed Sep. 7, 2007, U.S. Provisional Patent Application Ser. No. 60/848,148 filed Sep. 29, 2006, U.S. Provisional Patent Application Ser. No. 60/857,079 filed Nov. 6, 2006, U.S. Provisional Patent Application Ser. No. 60/855,958 filed Nov. 1, 2006, and U.S. Provisional Patent Application Ser. No. 60/911,564 filed Apr. 13, 2007 are related to the instant application.

The instant application claims priority to U.S. Provisional Patent Application Ser. No. 60/848,148 filed Sep. 29, 2006 and the entire subject matter set forth therein is incorporated herein by reference. The instant application claims priority to U.S. patent application Ser. No. 11/672,853 filed Feb. 8, 2007 and the entire subject matter set forth therein is incorporated herein by reference. U.S. patent application Ser. No. 11/672,853 filed Feb. 8, 2007 claims priority to U.S. Provisional Patent Application Ser. No. 60/771,771 filed Feb. 9, 2006 and U.S. Provisional Patent Application Ser. No. 60/781,959 filed Mar. 12, 2006.

The instant application is a continuation-in-part of U.S. patent application Ser. No. 11/672,853 filed Feb. 8, 2007.

All of the applications identified above have the inventor, Karl F. Scheucher, the inventor of the instant application, herein.

FIELD OF THE INVENTION

The invention is in the field of rechargeable high capacity cordless power supplies.

BACKGROUND OF THE INVENTION

No known power supply comprises a cordless power supply which can be used for a variety of cordless power needs.

SUMMARY OF THE INVENTION

The cordless power supply of the instant invention includes removable batteries which are removably attached to a power conversion unit. The power conversion unit in turn comprises the functions of converting the input power from the removable battery into one or more widely used types of output power including but not limited to AC line power, 12 or 24 volt automotive level DC power, and 5-volt logic level DC power such as that supplied by the Universal Serial Bus (USB) connectors ubiquitous on personal computers and peripherals. The cordless power supply may be: used to power an electric hedge trimming device; used for extended run time or recharging with a laptop or other computer used in the field for research; used to power an electric drill; used to power an electric blender; and, used to power just about any electrically powered device. The cordless power supply uses rechargeable batteries.

The cordless power supply of the instant invention comprises a battery, a power conversion unit, and a tool side connection permanently or removably connected to the power conversion unit, said tool side connection functioning to mechanically and electrically inter-mate with the aforesaid battery. The term—power conversion unit—includes a DC to AC inverter, a DC to DC converter and an AC to DC converter as set forth in U.S. patent application Ser. No. 11/672,853 filed Feb. 8, 2007 and which disclosure is incorporated herein by reference in its entirety the same as being rewritten herein. The terminology—tool side connection—is used to explain use of fittings which mate both electrically and mechanically with batteries having corresponding battery side connections. The batteries used in the invention may be rechargeable tool batteries which are made by a plurality of manufacturers or any other power source as set forth in U.S. patent application Ser. No. 11/672,853 filed Feb. 8, 2007 and which disclosure is incorporated herein by reference in its entirety the same as being rewritten herein. The batteries may also be original equipment batteries made specifically for use with and comprising part of the instant invention. The power conversion units used in the invention may be products made by a plurality of manufacturers which are then modified to include the aforementioned tool side connection. The power conversion units may also be original equipment units made specifically for use with and comprising part of the instant invention. The invention includes three ways for implementing the tool side connection to the power conversion unit. The three ways include: (1) permanent mounting or integral molding of the tool side connection to the power conversion unit; (2) one-piece field changeable mounting of the tool side connection to the power conversion unit; and, (3) a quick-changeable mounting of the tool side connection to the power conversion unit using a first standard coupling half mounted to the power conversion unit along with a second coupling half/tool side connection (an adapter, i.e., a quick changeable connection). Once an appropriate tool side connection is enabled to the power conversion unit, any battery of the corresponding type having the corresponding battery side connection may be quickly attached and quickly detached. These modes will be described further in detail below.

The invention comprises a power conversion unit to be powered from an automotive, motorcycle, boat, or other type of vehicle having a DC based electrical system. Power may be derived from one or more 12V automotive accessory sockets (cigarette lighter style) or directly from the battery terminals of a given vehicle using a vehicle power adapter which is part of the instant invention. The adapter comprises a quick disconnect vehicle side connector appropriate to inter-mate with the vehicle power source, a quick disconnect battery side connector module that inter-mates with the tool side connector of the power conversion unit, and an electrical cable interconnecting the vehicle side and battery side connections.

Typically, automobile power outlets including the cigarette lighters on the dash are current limited, typically supplying a maximum of 10 to 15 amps at 12 volts or power levels of approximately 100 to 180 watts. This may be less than the power input required by the power conversion unit to produce its maximum power output. For example, the power conversion unit may have a maximum power output of 400 watts. Further the power conversion unit may operate with conversion efficiency in the 80% to 90% range. Thus the power input required to produce the 400 watt output level is in the range of 444 to 500 watts. This input power level will require DC currents from a 12 volt automobile system on the order of 37 to 42 amps, much higher current levels than can be supplied by a single automotive accessory, cigarette style power outlet typically The instant invention addresses this problem in several ways. First, the invention provides for the power conversion unit to be connected directly to the vehicle's battery by relatively short, robust clips and wire connections capable of carrying the large currents just mentioned. Secondly, the invention allows a version of the power conversion unit having multiple power inputs, also part of the instant invention, to be simultaneously connected to multiple cigarette style power outlets. The power conversion unit will then use as much current or power as is readily available from each outlet achieving a total input power which is the sum of the available, individual input powers. The power conversion unit may determine how much power is available from a given input source by monitoring the voltage of the source. As more current is drawn from a given source, the source voltage will tend to drop because of the source's inherent resistance. The power conversion unit may operate in a way to draw current from a given source only to the degree that the source voltage remains above some lower threshold voltage limit. This is called the minimum source voltage current limiting algorithm in the present invention. Alternatively, the instant invention considers providing circuitry in the aforementioned vehicle power adapter that will serve to limit the current provided via said adapter to some pre-defined maximum level, for example, 10 amps. Such circuitry may be conveniently housed in the battery side connection housing of the vehicle power adapter or elsewhere. This is called the vehicle adapter current limiting circuit in the instant invention. By applying the minimum source voltage current limiting algorithm, using the vehicle adapter current limiting circuit, or using both in combination, the current drawn from any single vehicle source may be effectively limited to a level that precludes damage to said source. This in turn allows multiple sources as described above to be used in parallel, each to its respective current limit, to derive a power level that is the maximum available from the given sources. The opportunity to exploit this aspect of the present invention to great utility is readily available since many contemporary vehicles are manufactured with two or more current-limited, accessory power outlets.

Another example of the invention includes a tool side connection directly mounted to the power conversion unit which interengages a specific battery manufactured by a cordless tool company.

Accordingly it is an object of the instant invention to provide a cordless power supply.

It is a further object of the present invention to provide a cordless power supply which is portable.

It is a further object of the present invention to provide a cordless power supply which employs one or more dual use cordless batteries.

It is a further object of the present invention to provide a cordless power supply which employs commercially available batteries from many different manufacturers.

It is a further object of the present invention to provide a cordless power supply which can supply power to a battery charger for recharging a battery effectively transferring energy from one battery to another.

It is a further object of the present invention to provide a cordless power supply which can use input power from a cordless tool battery, an automotive or other vehicle born battery, or another battery type, can provide power to a cordless tool battery charger, vehicle battery charger or other battery charger type, and can thusly transfer energy from the input battery type to the battery affixed to the battery charger being powered.

It is a further object of the invention to provide a vehicle power adapter which allows one or more sources of vehicle power to be used to power the power conversion unit of the portable power supply.

It is a further object of the invention that the vehicle power adapter have a quick disconnect vehicle side connector for interfacing with the vehicle power sockets or battery directly, a quick disconnect battery side connector module for interfacing to the tool side connector of the power conversion unit, and a cable to convey electrical energy from the vehicle side connector to the battery side connector.

It is a further object of the invention that circuitry may be included in the vehicle power adapter to condition and regulate the electrical power flowing from the vehicle to the power conversion unit.

It is a further object of the present invention to provide a tool side connector permanently affixed to the power conversion unit (permanent tool side connector) such that the power conversion unit of the cordless power supply can readily accept the battery type having the corresponding battery side connection. In this way, only one battery type is useable and the power conversion unit need be adaptable only to that battery type.

It is a further object of the present invention to provide a one-piece field changeable tool side connector affixed to the power conversion unit by external fasteners such as machine screws, said screws being arranged in one of several standardized, common geometric patterns, said screws functioning to retain the connector to the power conversion unit, said screws also functioning as electrical conducting elements between the tool side connector contacts and the power input circuitry internal to the power conversion unit thus serving to carry input current from the battery through the tool side connector to the input of the power conversion unit circuits.

It is a further object of the present invention, using the one-piece field changeable tool side connector just described, to allow field interchange of a first tool side connector type for a second type, said interchange accomplished by simply removing the screw fasteners retaining the first connector and replacing the first connector type with a second connector type, then replacing the screws to retain the second connector and to make electrical connection between the second connector type and the power conversion unit.

It is a further object of the present invention to include different types of power conversion units each using a one-piece field changeable tool side connector, a first type of power conversion unit having a range of input and output characteristics different from yet possibly overlapping a second type of power conversion unit such that the first type power conversion unit may be compatible with a number of different battery types but possibly not every battery type with which the second type of power conversion unit is compatible.

It is a further object of the present invention to make a first type power conversion unit with a geometric screw pattern for receiving various one-piece field changeable tool side connectors and to make the various one-piece field changeable tool side connectors for each battery type compatible with the first type power conversion unit. The one-piece field changeable connectors associated with battery types not compatible with the first type power conversion unit will have a geometric screw pattern which does not allow its mounting upon the particular power conversion unit.

It is a further object of the present invention to provide a two-piece quick changeable tool side connector system comprising a first coupling half having a standardized geometric screw pattern for connecting said first half both mechanically and electrically to a power conversion unit, and comprising a second coupling half having a tool side connector intermating only with a particular battery type, first and second coupling halves themselves interfacing one another in a quick disconnect fashion such that ultimate mechanical and electrical connection is established between the power conversion unit and the battery through the two coupling halves of the two-piece quick changeable tool side connector.

It is a further object of the present invention, using the two-piece quick changeable tool side connector just described, to allow a the second coupling half of said connector to be quickly and conveniently exchanged for a different second coupling half to the effect that the power conversion unit may be quickly and conveniently adapted to different compatible batteries compatible with respective second coupling halves.

It is a further object of the present invention to make a first type power conversion unit with a geometric screw pattern for receiving a first coupling half of a two-piece quick changeable tool side connector and to make the various second coupling halves of the two-piece quick changeable tool side connector for each battery type, said second coupling half being compatible with the first coupling half which is compatible with the first type power conversion unit. The second coupling halves intermatable with battery types not compatible with the first type power conversion unit will have a quick disconnect interfaces not compatible with the first coupling half and will therefore not allow the second coupling half or the battery with which it intermates to be connected to the first coupling half of the particular power conversion unit which is not compatible with said battery.

These and other objects of the invention will be best understood when reference is made to the Brief Description Of The Drawings and the Description Of The Invention below.

BRIEF DESCRIPTION OF THE DRAWINGS

FIG. 7J is an exploded illustration of a first standard coupling half of a two-piece quick changeable tool side connector system affixed to a power conversion unit, the second standard coupling half of said connector system shown integral with a tool side connection, and a battery shown with battery connection side not visible shown positioned for engagement with the tool side connection.

FIG. 8 is an illustration of a vehicle power adapter with vehicle side connection implemented via quick connect clips which may be connected directly to the vehicle battery, and with a battery side connection module connected to the vehicle side connector by an electrical cable.

FIG. 8A is an illustration similar to FIG. 8 showing a vehicle side connection of the type to interface with a 12 volt accessory power socket of the cigarette lighter type.

The drawings will be better understood when reference is made to the Description of the Invention and Claims which follow hereinbelow.

DESCRIPTION OF THE INVENTION

Figure 1:
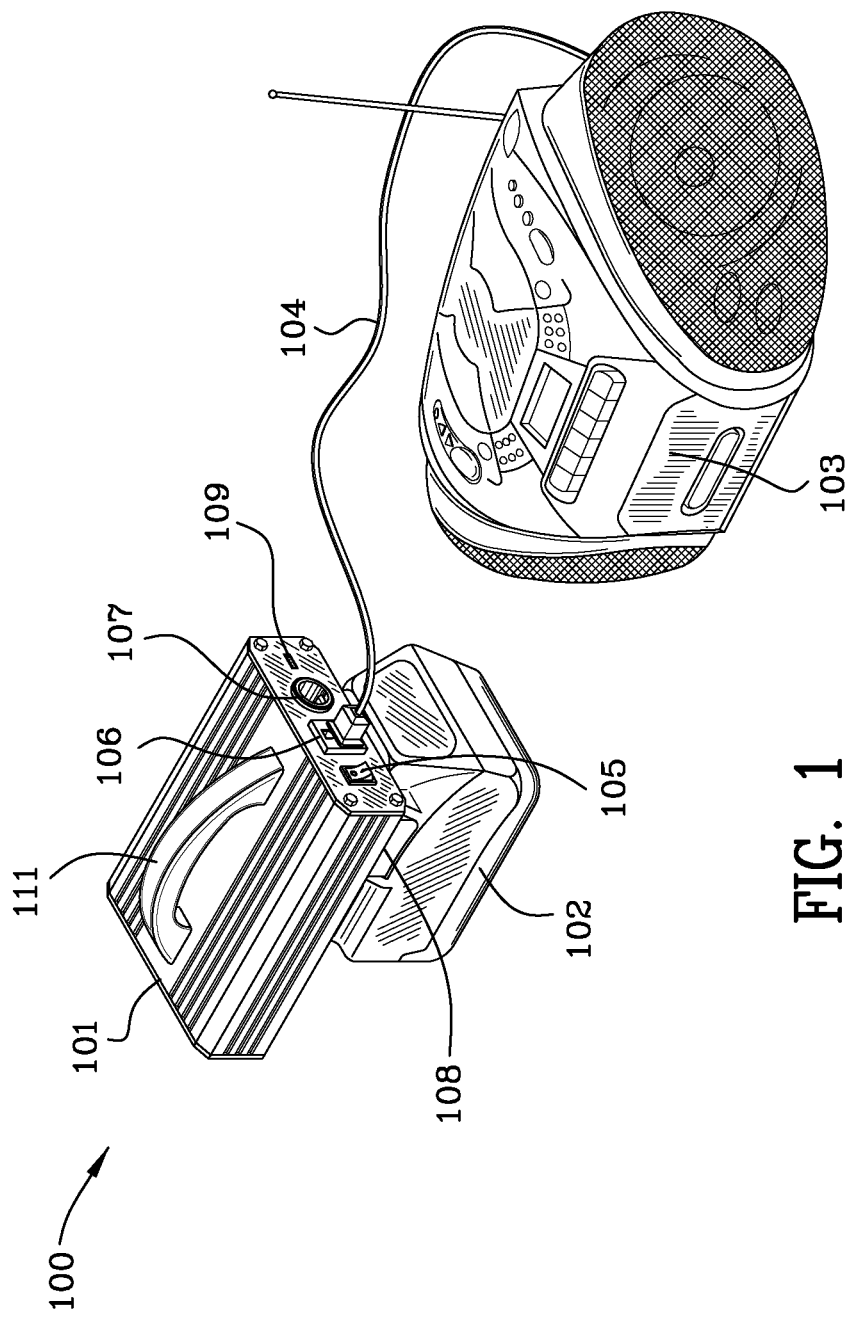
FIG. 1 is an illustration of a power conversion unit and a cordless tool battery coupled together shown supplying AC power to a radio/tape player/compact disc player.
Figure 1A:
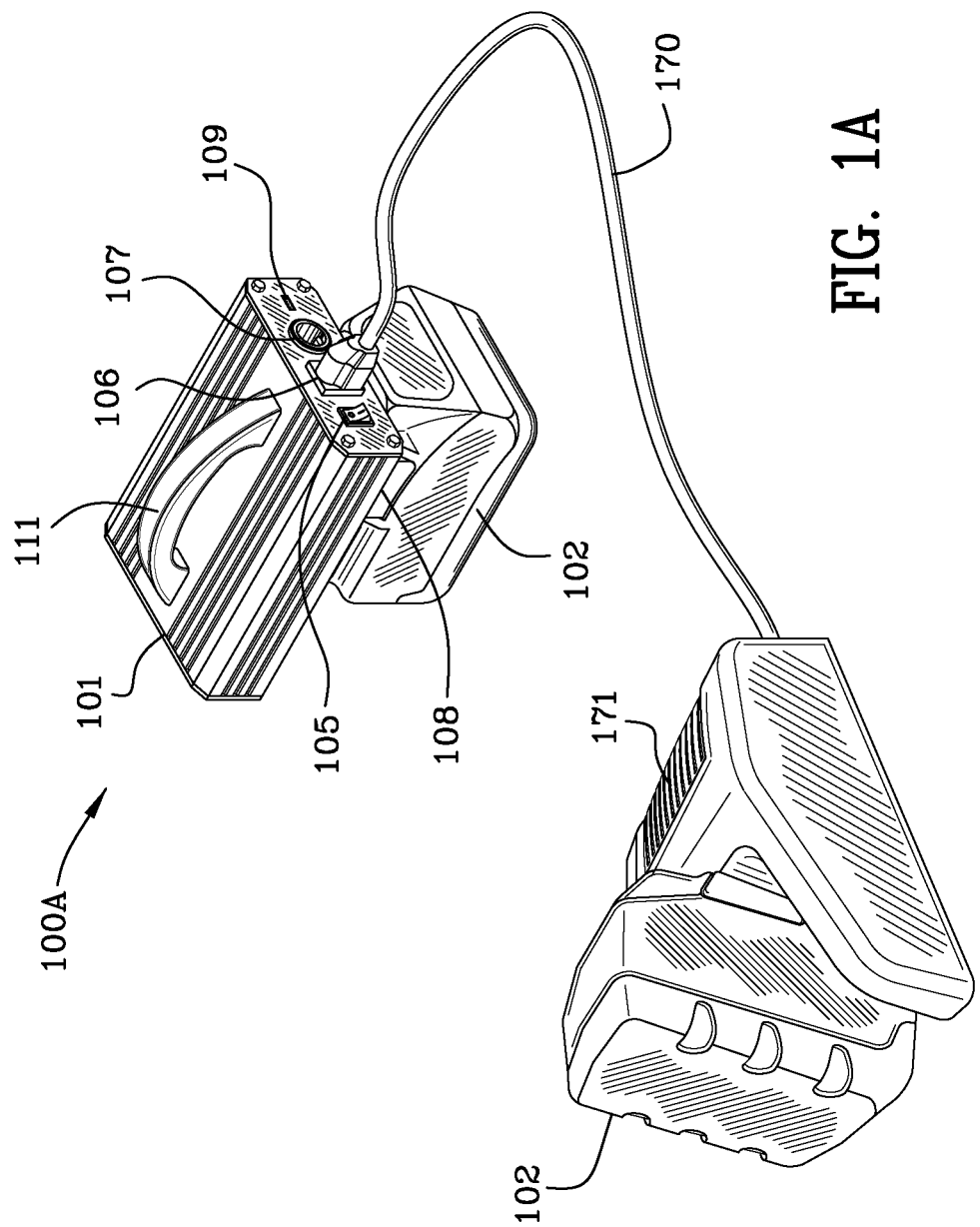
FIG. 1A is an illustration similar to FIG. 1 shown with a power conversion unit and a cordless tool battery supplying power to a cordless tool battery charger charging a second cordless tool battery.
Figure 1B:
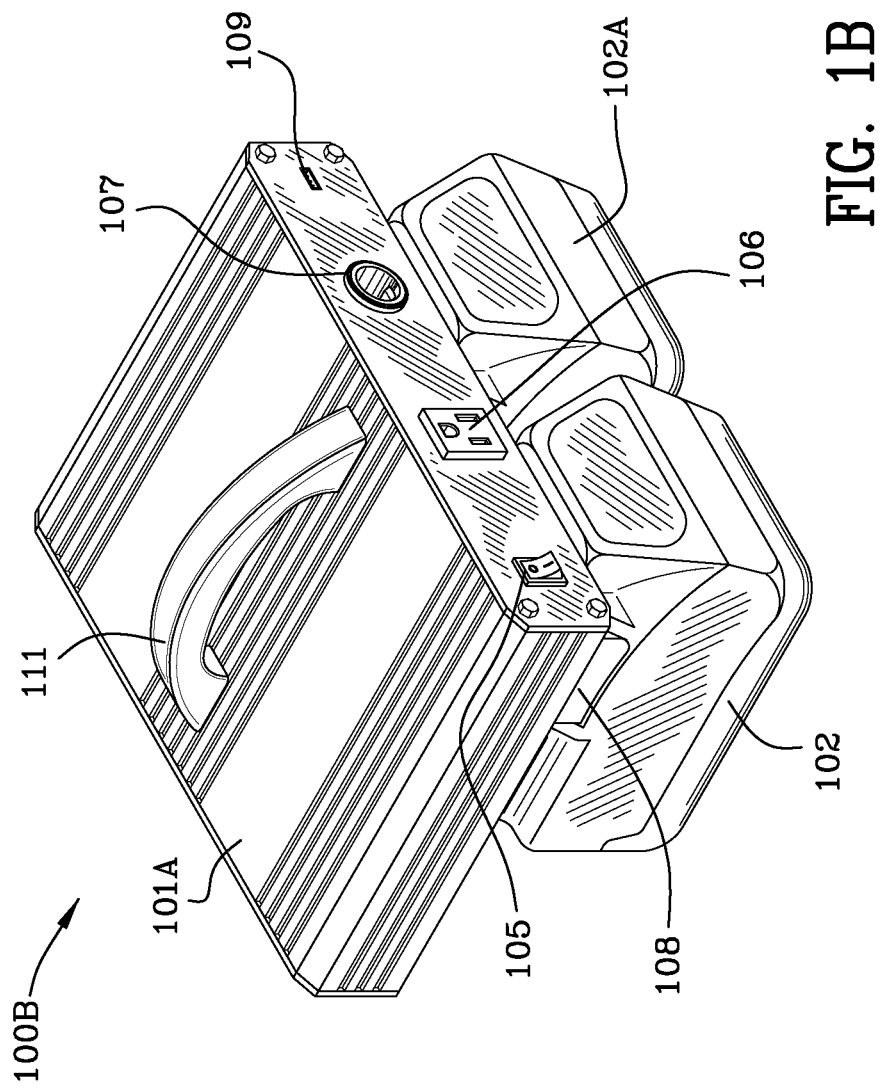
FIG. 1B is an illustration similar to FIG. 1 with two cordless tool batteries are shown affixed to a power conversion unit.

FIG. 1 is an illustration 100 of a power conversion unit 101 and a cordless tool battery 102 coupled together shown supplying AC power by way of a power cord 104 to a radio/tape player/compact disc player 103. Reference numeral 108 signifies the attachment of the battery 102 to the power conversion unit as is set forth in detail below. Power switch 105 enables power to the alternating current outlet 106, the 12 volt direct current outlet 107 and the 5 volt USB connections 109. Handle 111 facilitates movement of the cordless power supply. The batteries illustrated in FIGS. 1, 1A and 1B are high-powered cordless tool batteries manufactured by Milwaukee Electric Tool Corporation of Brookfield, Wis. These higher powered cordless tool batteries are useful in the cordless power supply invention because they operate in an appropriate voltage range, have sufficiently high current capabilities, store a relatively large amount of energy, are relatively light weight and rugged, and are readily available. Further, many users who stand to benefit from the cordless power supply invention described herein may already own other cordless tools and therefore have in their possessions cordless tool batteries and a cordless tool battery charger which may be re-used with the cordless power supply. One type of cordless tool battery supplied by the aforementioned Milwaukee Electric Tool Corporation battery has a nominal operating voltage of 26 volts and can supply 10 to 20 amps continuously (250 to 500 watts), weighs only a few pounds and stores approximately 70 watt-hours of energy.

The cordless power supply includes a power conversion unit which is a DC to AC inverter and/or a DC to DC converter. The battery is in the voltage range of 3.75 VDC to a multiple "n" times 3.75 VDC and within the range of typical cordless tool batteries. The cordless power supply comprises a plurality of batteries and a power conversion unit or a plurality of batteries and a plurality of power conversion units.

Any batteries are shown in this patent application by way of example only and they may comprise cordless tool batteries of all chemical types, all sizes, and all capacities imaginable. For instance, the batteries may be Lithium Ion (Li-Ion), Nickel Metal Hydride (NiMH), a lead acid battery, a Li-polymer battery, or an Alkaline battery. Further, any voltage and capacity battery may be applicable since the power conversion units may be manufactured to selectively accept only those batteries that are compatible therein.

In one instance, the power conversion unit as illustrated in FIG. 1 may be provisioned only to convert battery input DC power into line voltage AC power, not providing the automotive DC or USB DC power conversions and outputs. In the simplified, DC to AC inverter only case, the power inversion function may be similar to the functions of commercially available power inverters such as those manufactured by Kingson Electronics Co., Ltd, Taipei, Taiwan or by Power Bright Ltd., Montreal, Quebec, Canada. These and other manufacturers may produce various power conversion products which may be readily adapted with an adaptive interface (an element of the present patent application described herein) to operate in a cordless fashion with various batteries as described throughout this application. FIG. 1A is an illustration 100A similar to FIG. 1 shown with a power conversion unit 101 and a cordless tool battery 102 driving a cordless tool battery charger 171. The cordless tool battery charger is interconnected to the cordless power supply by power cord 170. This arrangement permits the sharing of energy between batteries 102 in, for instance, a military application enabling two soldiers, one having a fully charged battery, one having a fully discharged battery for example, to share power in the field to supply a variety of devices. Alternatively, battery charger 171 could be of the type readily available intended to charge vehicle batteries such as an automotive battery charger. In that case the cordless power supply allows the user to use a cordless tool battery 102 to charge a car battery which may be very useful in the event of recovering from a dead vehicle battery in the field.

FIG. 1B is an illustration 100B similar to FIGS. 1 and 1A with two cordless tool batteries 102, 102A shown affixed to a power conversion unit 101A. This arrangement has the benefit of increasing the available input power for operating at higher output currents and the available input energy for operating for longer periods of time.

Figure 2:
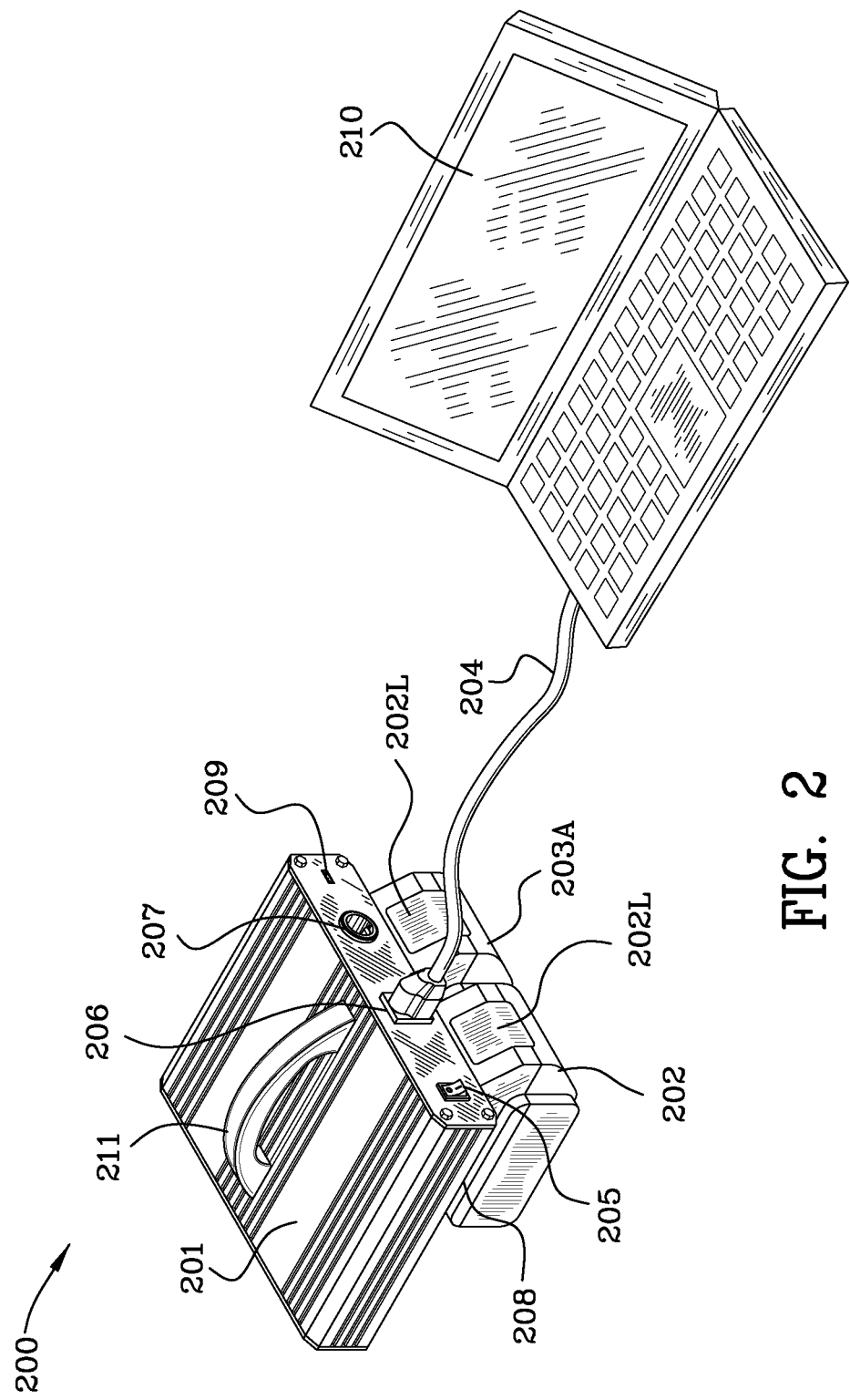
FIG. 2 is an illustration of a power conversion unit with two cordless tool batteries coupled thereto shown supplying a laptop computer with AC power.

FIG. 2 is an illustration 200 of a power conversion unit 201 with two cordless tool batteries 202, 202A coupled thereto shown supplying (via a power cord) a laptop computer 210. The batteries 202, 202A illustrated in FIG. 2 are manufactured by MAKITA CORPORATION of AICHI-KEN, JAPAN. Makita is believed to be a registered trademark of MAKITA CORPORATION of AICHI-KEN, JAPAN. Reference numeral 202L is used to designate the locking device of the Makita batteries 202, 202A which mate with a tool side connector for affixation to the power conversion module 201. This type of cordless tool battery supplied by Makita has a nominal operating voltage of 18 volts and can supply 10 amps continuously (180 watts), weighs only a pound and a half and stores approximately 40 watt-hours of energy. Attachment of the Makita batteries to the power conversion unit is generally denoted by reference numeral 208. The attachment involves interaction of various surfaces of the Makita battery with a tool side connection which in turn is affixed to the power conversion unit by one of three modes described below. Reference numeral 205 is used to indicate the power switch which enables power to alternating current outlet 206, automotive direct current outlet 207 and/or the direct current USB outlet 209. Handle 211 facilitates movement of the cordless power supply.

Figure 2A:
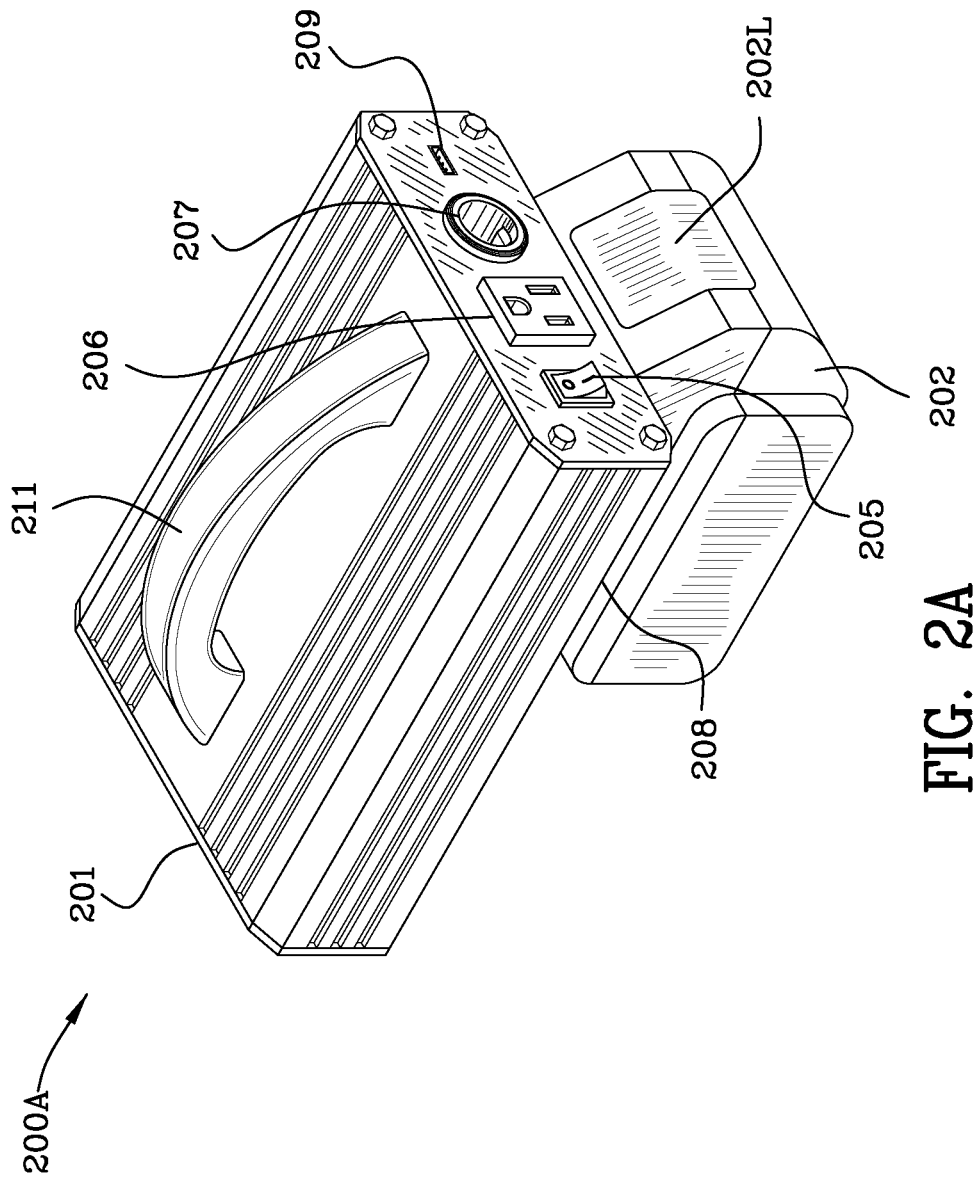
FIG. 2A is an illustration of a cordless power supply comprising a power conversion unit with a cordless tool battery coupled thereto.

FIG. 2A is an illustration 200A of cordless power supply comprising a power conversion unit 201 with a single cordless tool battery 202 coupled thereto. FIG. 2A depicts a cordless power supply having a single cordless tool battery 202 as compared to FIG. 2 which illustrates a cordless power supply which includes two batteries.

Figure 3:
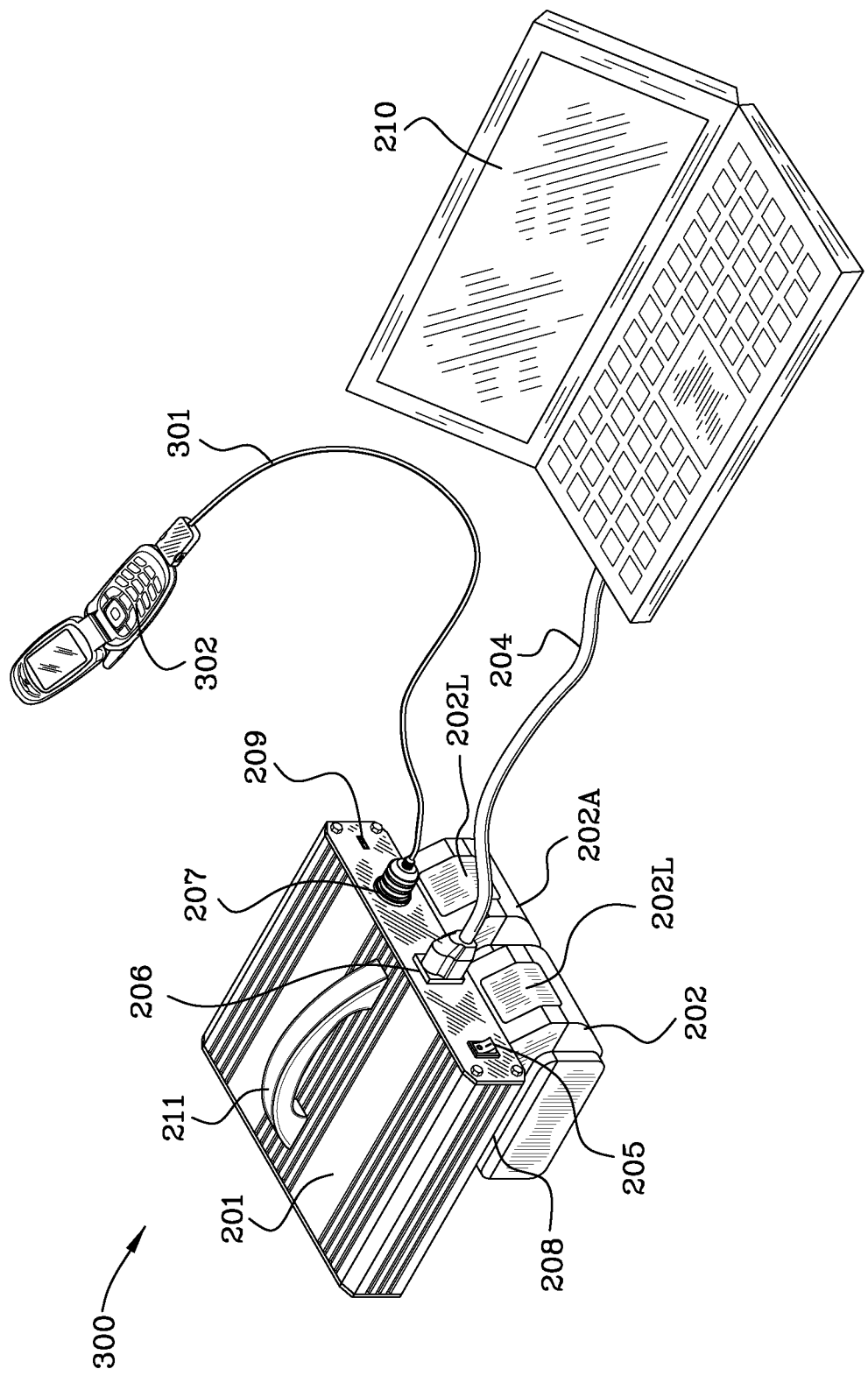
FIG. 3 is an illustration of a cordless power supply similar to FIG. 2 shown supplying 12 volt DC electric power to a cell phone and providing AC power to a laptop computer.

FIG. 3 is an illustration 300 similar to FIG. 2 shown supplying electric power to a cell phone 302 and a laptop computer 210. Power cord 301 interconnects the cordless power supply's 12 volt DC output to the cell phone 302.

Figure 4:
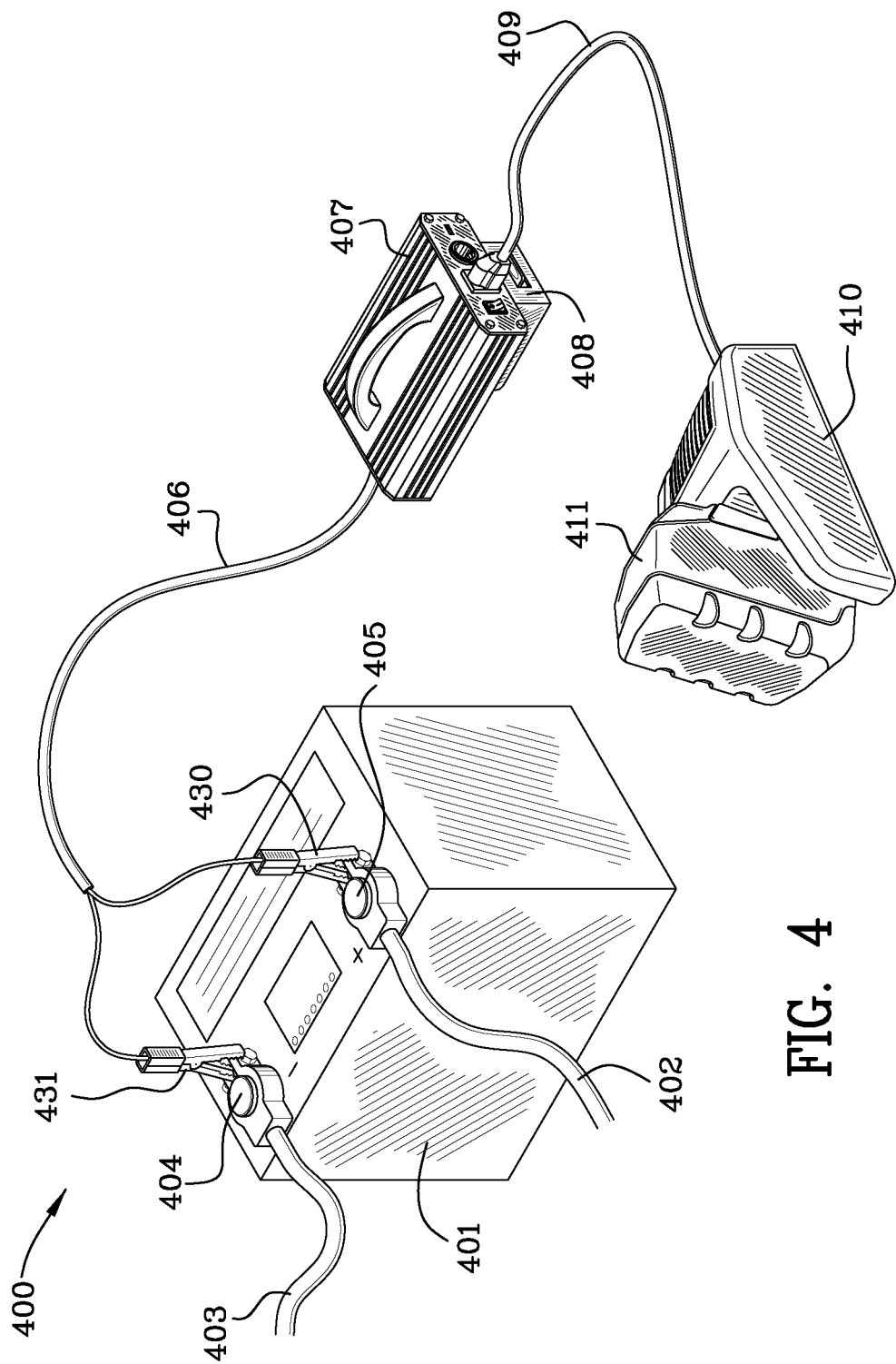
FIG. 4 is an illustration of an automobile battery supplying power via a directly connected vehicle adapter to a power conversion unit which in turn applies AC power to a cordless tool battery charger charging a cordless tool battery.

FIG. 4 is an illustration 400 of an automobile battery 401 supplying power to a power conversion unit 407 via a vehicle power adapter comprising battery side connector 408 and vehicle side connectors 430 and 431 connected together by cable 406. Power conversion unit 407 then provides AC power to cordless tool battery charger 410 thus charging cordless tool battery 411. The clamps contacts 430, 431 of the vehicle side connector of the vehicle power adapter are of the spring-loaded type for gripping the terminals of the battery 405, 404 or for gripping the unnumbered clamps of the battery cables 402, 403. Battery cables 402, 403 are illustrated as in electrical communication with terminals 405, 404, respectively. The version of vehicle power adapter used in FIG. 4 is depicted individually in FIG. 8.

Figure 4A:
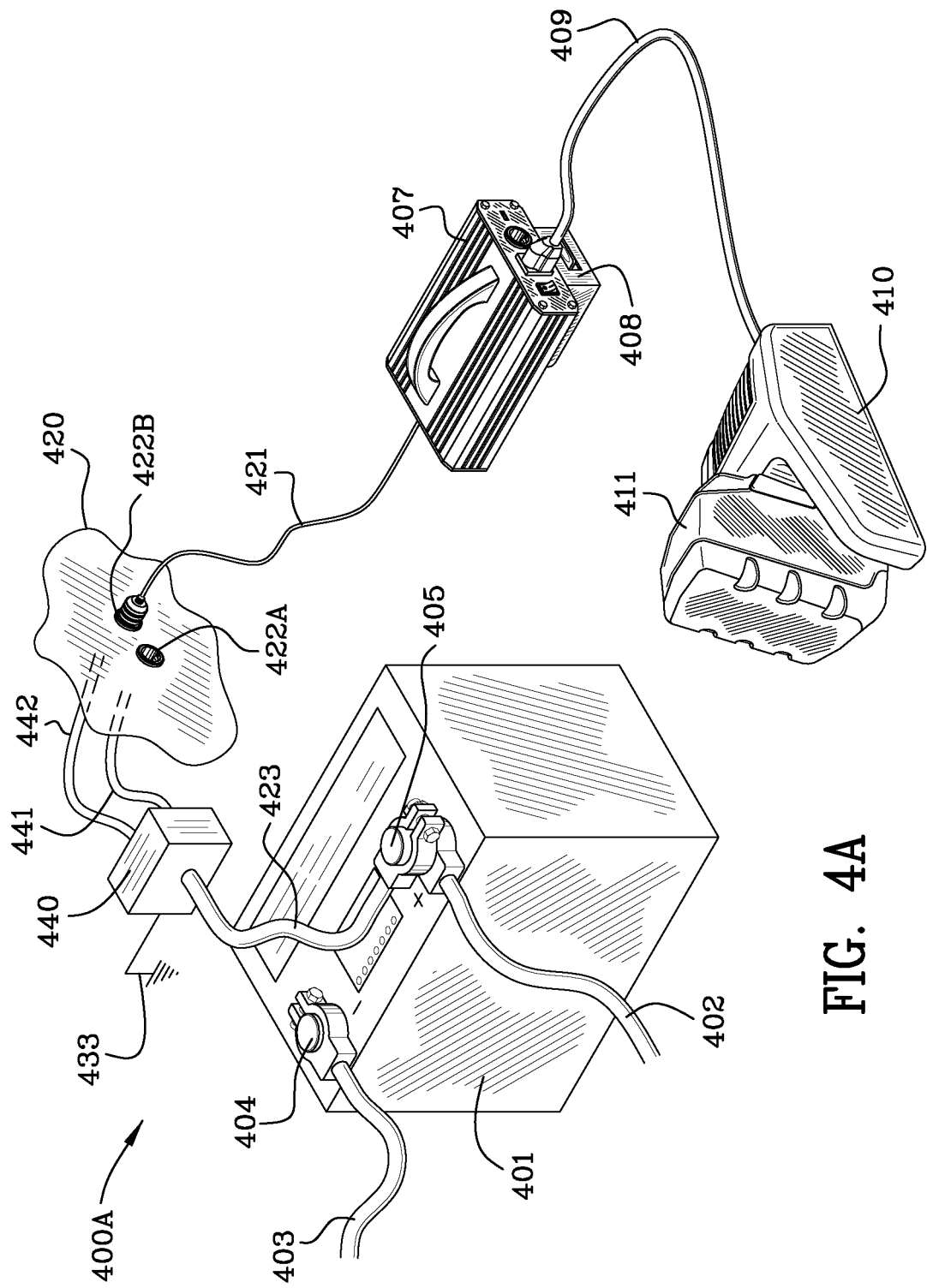
FIG. 4A is an illustration of an automobile battery supplying power via a current limited accessory power outlet to a vehicle adapter connected to a power conversion unit which in turn supplies AC power to a cordless tool battery charger charging a cordless tool battery.

FIG. 4A is an illustration 400A of an automobile battery 401 supplying current-limited vehicle accessory power outlets (receptacle) 422B and 422A on the dash 420 of an automobile. Accessory power outlet 422B sources power to the vehicle side connector (not numbered but shown in FIG. 8A as number 802) of a vehicle power adapter. As in FIG. 4, the power conversion unit converts the supplied vehicle power into an AC power source to power cordless tool battery charger 410 by cable connection 409. The charger in turn charges cordless tool battery 410. Since the input power from a given vehicle power accessory outlet may be limiting, the cordless power supply may correspondingly limit the maximum power it will draw from the power accessory outlet of the vehicle by one of several mechanisms. First, the power conversion unit may monitor its input voltage and constrain its current consumption to maintain said input voltage above some minimum voltage threshold. This was described above as the minimum source voltage current limiting algorithm Alternatively, circuitry may be configured and reside within the vehicle power adapter to both condition vehicle power in ways including stepping up or stepping down the vehicle voltage, and to limit the maximum current and/or power provided from the vehicle system to the power conversion unit. This was described as the vehicle adapter current limiting circuit above.

Still referring to FIG. 4A, the positive terminal of the battery 401 is interconnected by conductor 423 with a current-limiting devices within 440 which limits the current to mandatory maximum values on conductors 441, 442 which supply outlet receptacles 422A, 422B, respectively, located on the dashboard or elsewhere in an automobile, military vehicle, boat, motorcycle, off-road vehicle, or any other vehicle type. It is noteworthy that different vehicle types may have different characteristic voltage electrical systems and may have power accessory outlets with widely varying current sourcing abilities. For example, conventional automobiles typically have a 12 volt system and one or more accessory power outlets capable or sourcing 10 amps. Military vehicles typically have 24 volt electrical systems and may have power accessory outlets capable of sourcing 100 amps or more. The current-limiting device employed in any given vehicle type and any given circuit may be a resettable device or it may be a one time fuse. The current limiters may be solid-state circuit breaker, a relay-based breaker, fuse, etc. It is an objective of the invention to accommodate this wide range of electrical characteristics across different vehicle types by providing appropriate power conditioning circuitry in the vehicle power adapter and by incorporating appropriate circuitry and algorithms in the control section of the power conversion units. Reference numeral 433 denotes the ground or common of the overall vehicle electrical system.

Figure 5:
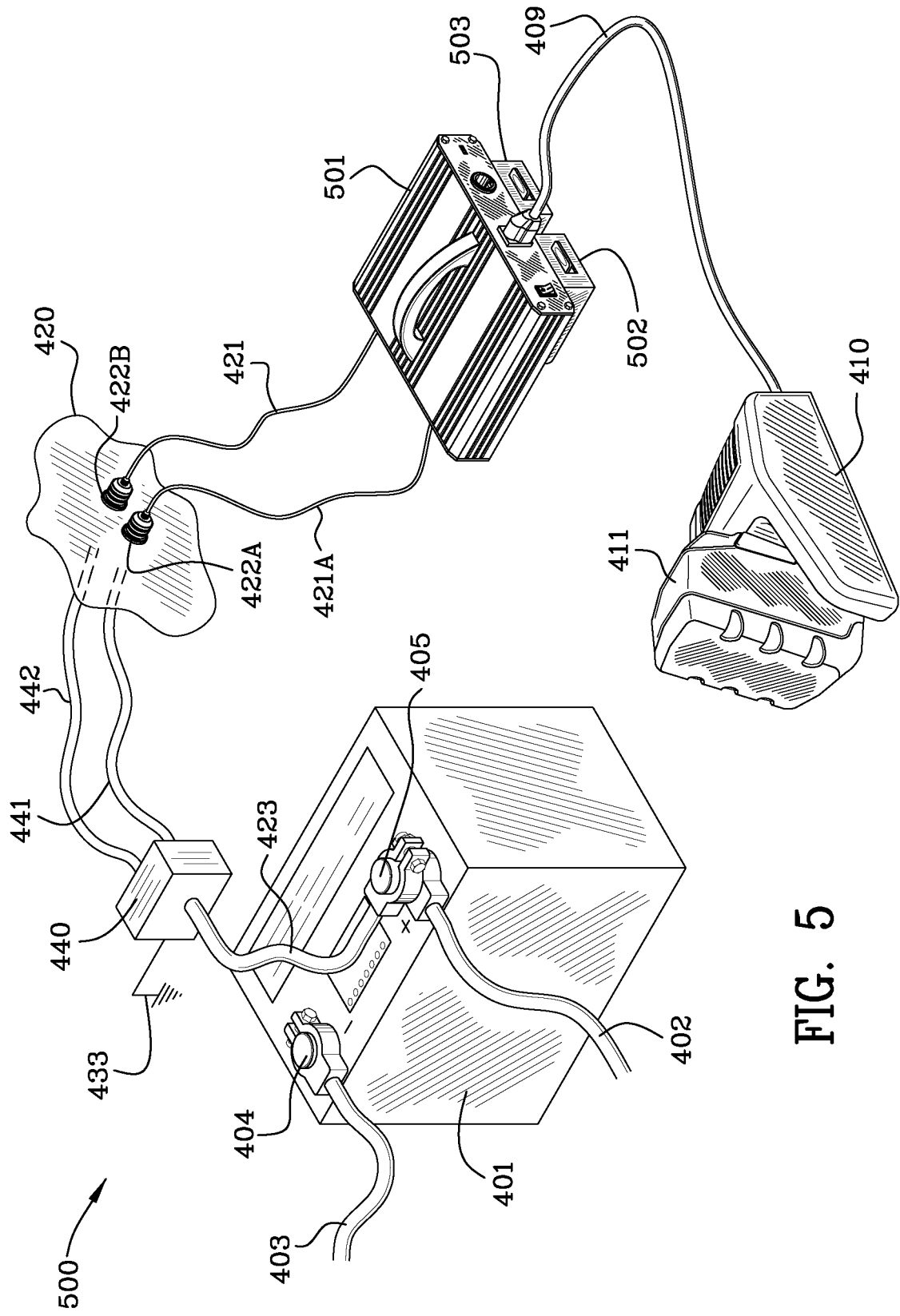
FIG. 5 is an illustration similar to FIG. 4A except that power is supplied via two vehicle accessory power outlets in parallel thus increasing the input power available to the power conversion unit and therefore available to the cordless tool battery charger.

FIG. 5 is an illustration 500 similar to FIG. 4A showing that multiple vehicle accessory power outlets may be simultaneously called upon to provide power to the power conversion unit, thus increasing the total input power available. In this case, two vehicle power accessory outlets 422A and 422B provide power via respective vehicle power adapters having cables 421A and 421 and battery side connector modules 502 and 503 to power conversion unit 501. If, for example, power accessory outlet 422A is limited to 10 amps and power accessory outlet 422B is limited to 15 amps, using the two in combination makes up to 25 amps available to the input of the power conversion unit. The aforementioned circuitry and algorithms of the vehicle adapter modules and the power conversion unit function to assure that 10 amps and 15 amps maximum respectively are drawn from the respective accessory outlets at any time.

Figure 6:
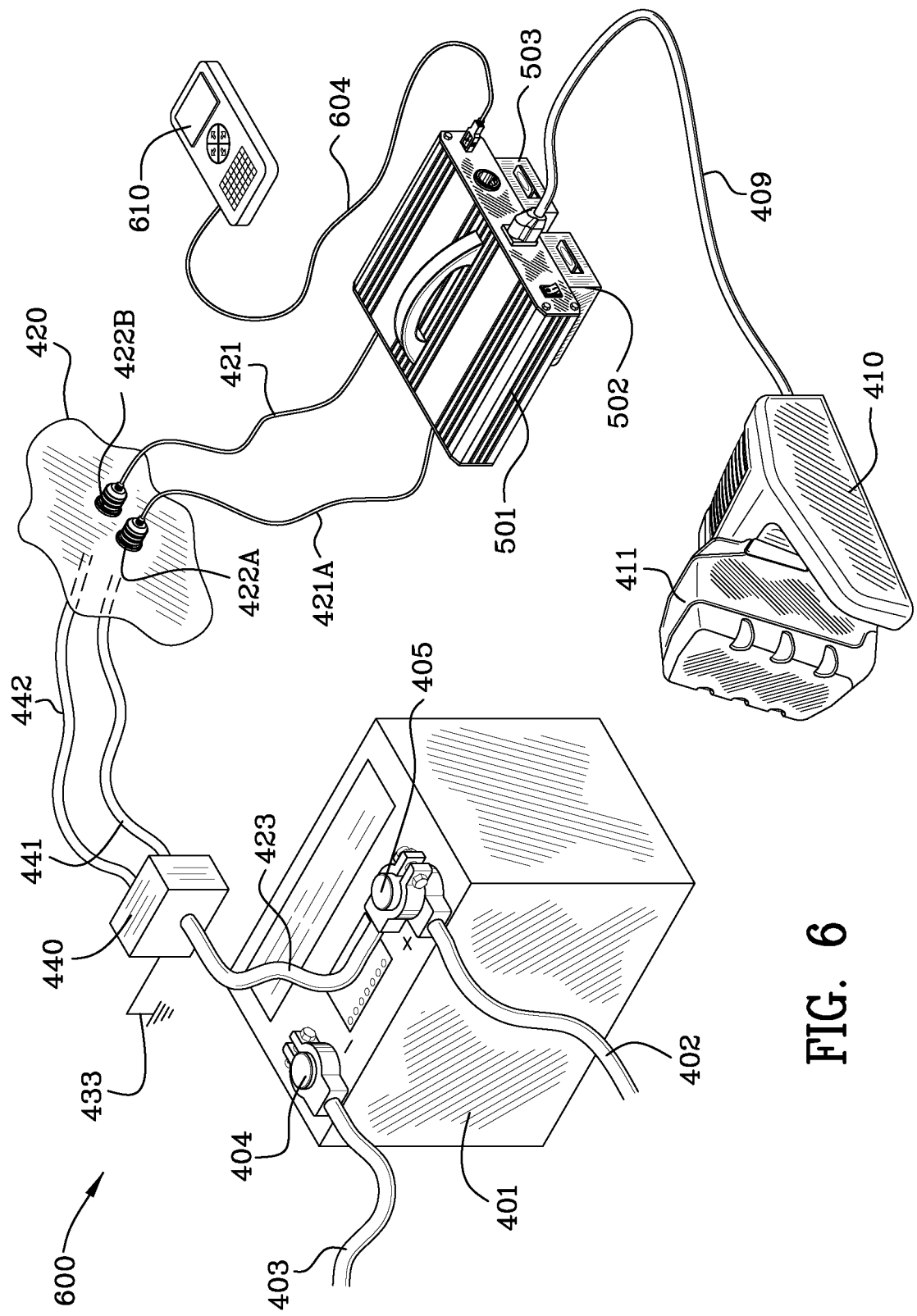
FIG. 6 is an illustration similar to FIG. 5 with an additional load of an IPOD, a registered trademark of Apple Computer, Inc., being driven by the 5V USB power output of the power supply.

FIG. 6 is an illustration 600 similar to FIG. 5 with an additional load of an IPOD 610 (a registered trademark of Apple Computer, Inc.) being driven by the power supply's 5 volt USB output via electrical conductor 604.

Figure 7:
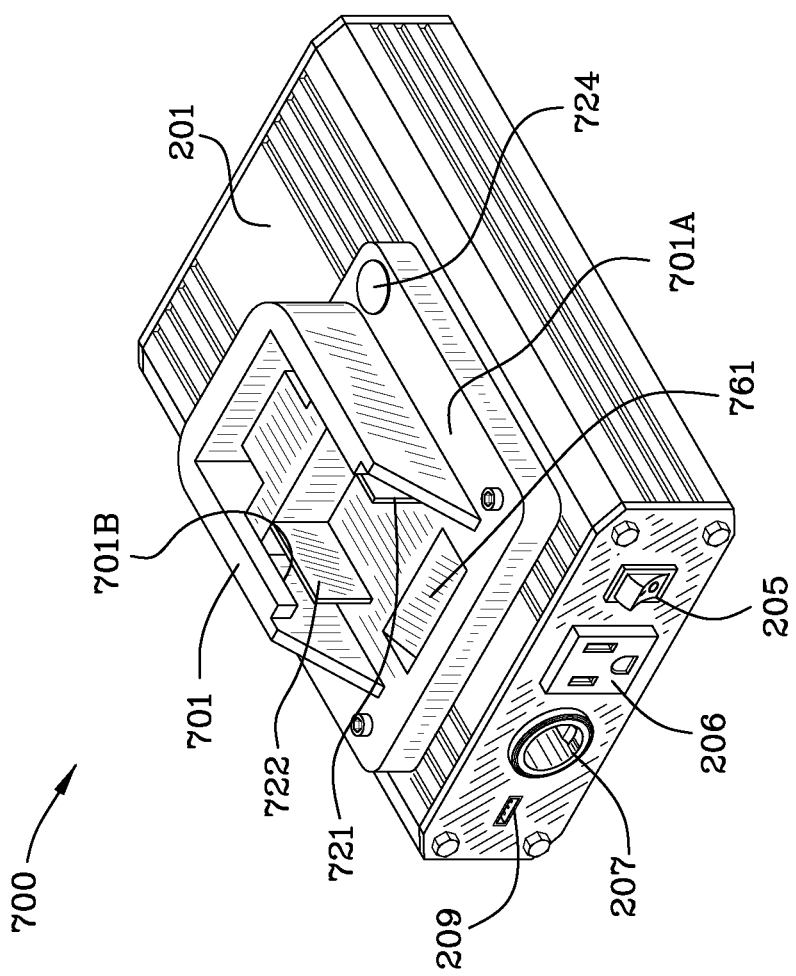
FIG. 7 is an illustration of a power conversion unit with a one-piece field changeable tool side coupling (tool side connection) mounted thereto.

FIG. 7 is an illustration 700 of a power conversion unit 201 with a one-piece field changeable tool side connector 701 adapted and mounted thereto. The tool side connector 701 is essentially the functional equivalent of a tool-side connection found on a portable tool such as a tool sold by Milwaukee Electric Tool Corporation, Ryobi, Dewalt, Makita, Rigid or any other cordless tool manufacturer. As such, the tool side connection allows intermating of the respective batteries sold by the aforementioned manufacturers with the power conversion unit of the present cordless power supply invention. As shown in FIG. 7, the one-piece field changeable tool side connector 701 is mounted to the power conversion unit by screws. The screws serve to provide both mechanical and electrical connections between the connector and the power conversion unit. A depression 761 has been adapted for the receipt of the locking member 202L as illustrated in other drawing figures and as mentioned above. The locking member has been redrawn in FIG. 7B and is denoted with reference numeral 706A. The Makita battery is denoted by reference numeral 706 and as shown represents a Lithium Ion battery.

Referring to FIG. 7 again, reference numeral 701A is considered a platform connected by unnumbered screws to the metal housing of power conversion unit 201. The tool side connection includes electrical conducts 721, 722 which are adapted in each type of tool side connection to mate with conductors for the particular type of standard cordless tool battery manufactured by the numerous manufacturers identified above and others. In the example illustrated in FIG. 7 the tool side connection has been designed to mate with an 18 volt direct current Makita battery illustrated in FIG. 7B. Tool side connection 701 includes surfaces 701B which interengage and restrain the movement of the Makita battery 706 when coupled or engaged with the tool side connection half These features of the tool side connection 701 in combination with the platform 701A constitute a one-piece field changeable tool side connector whereby a known Makita Lithium Ion cordless tool battery can be used to power a power conversion unit 201 which in turn supplies direct and/or alternating current outputs.

Figure 7A:
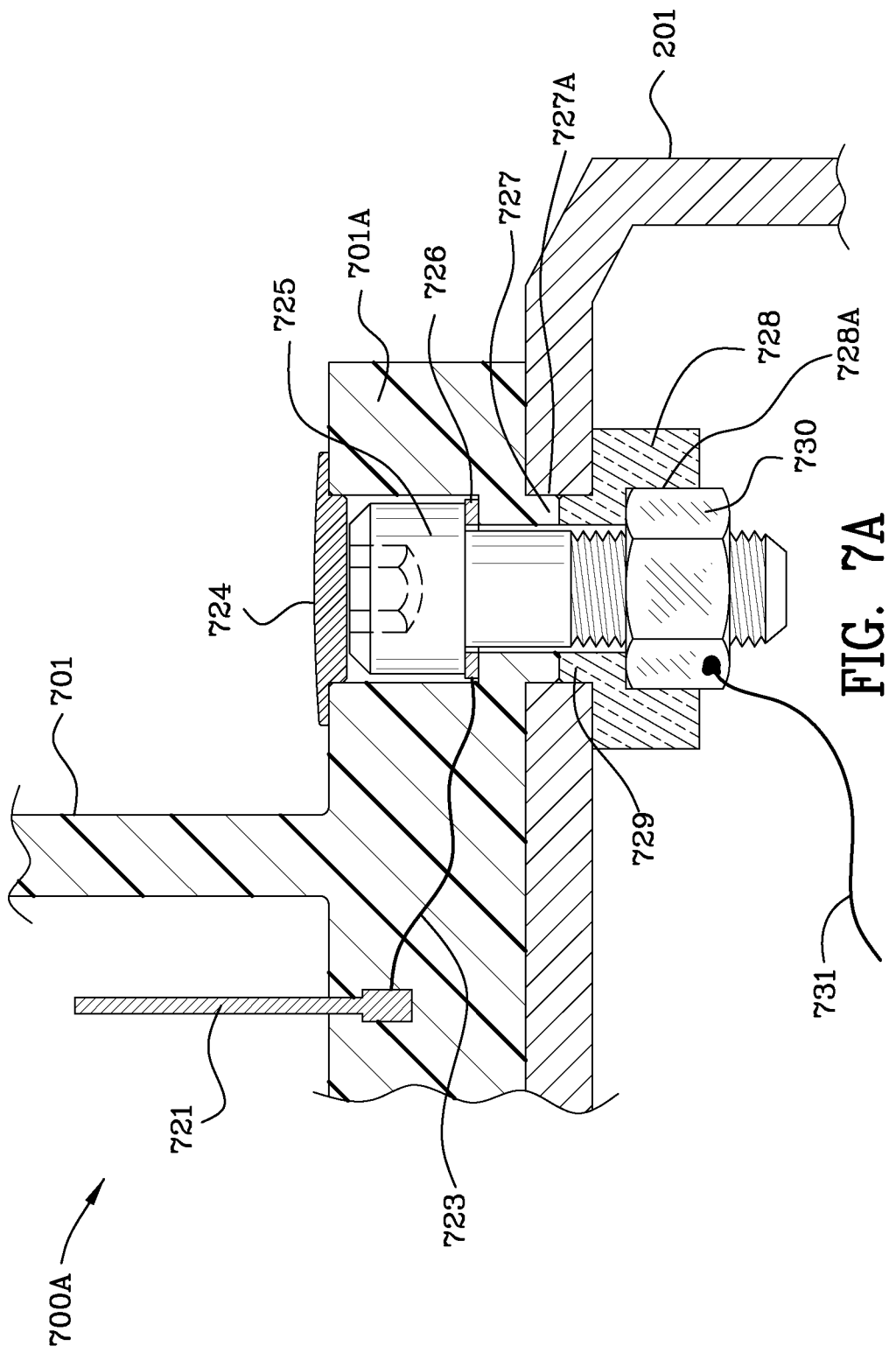
FIG. 7A is a schematic illustration of the method by which a machine screw accomplishes both mechanical and electrical connection between the one-piece field changeable tool side connector and its electrical contact and the power conversion unit and the wire leading to its electrical input.
Figure 7B:
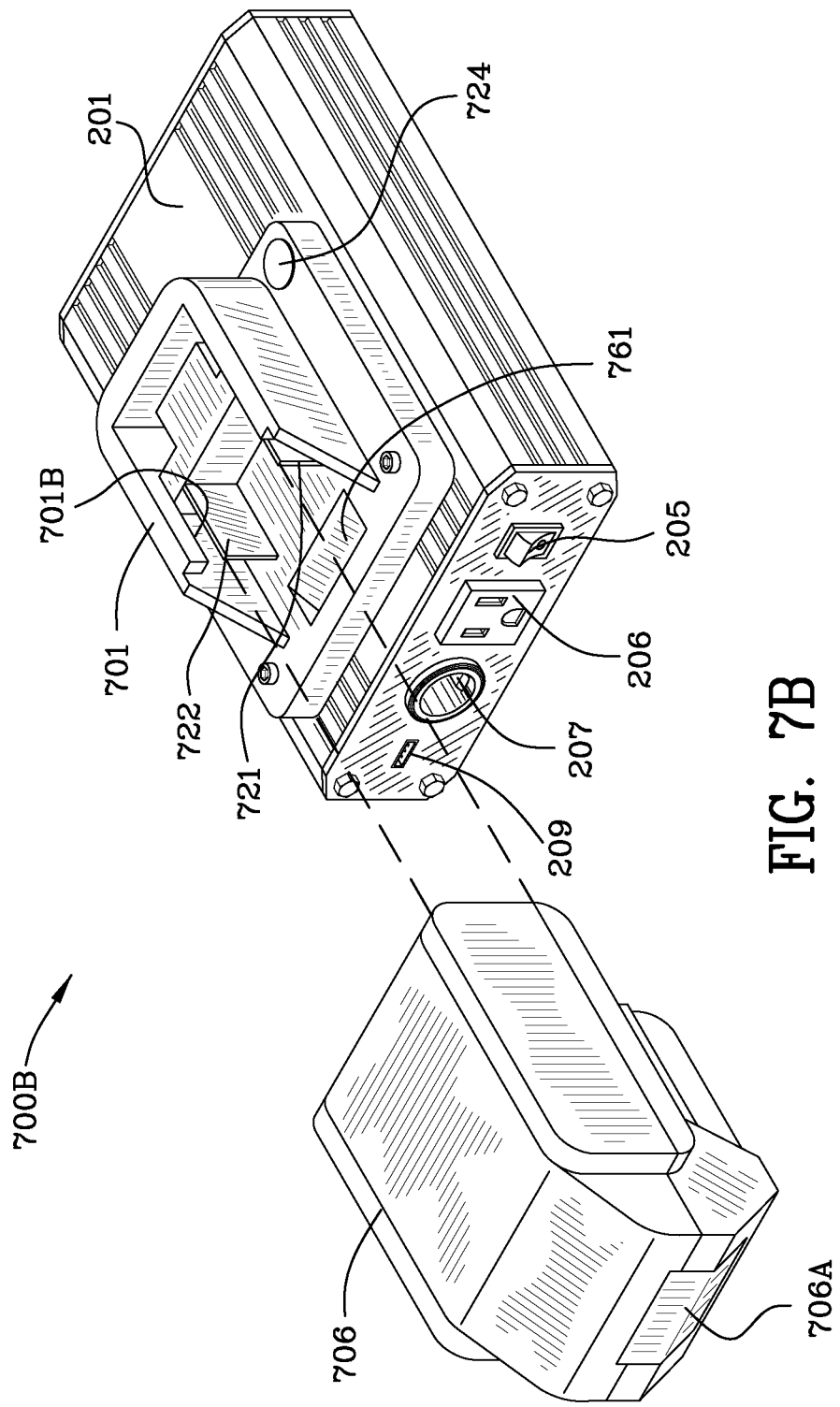
FIG. 7B is an exploded illustration similar to FIG. 7 illustrating a battery ready to be coupled to a one-piece field changeable tool side connector affixed and adapted to a power conversion unit.

FIG. 7A is a cross-sectional view demonstrating the electrical and mechanical attachment of a particular one-piece field changeable tool side connector 701 with a power conversion unit 201. Those skilled in the art will readily recognize that there are many alternative ways to route the energy into the power conversion unit without departing from the spirit and scope of the claims as set forth below In the example routing of FIG. 7A, tool side connector contact 721 is retained in the insulating body material of the tool side connector 701A. Wire conductor 723 electrically connects 721 to conductive washer 726. Electrically conductive machine screw or bolt 725 contacts washer 726 and passes through the hole in insulating boss 727, through the aperture 727A in power conversion unit housing 201, and through the hole in boss 729 of insulating bushing 728 to engage electrically conductive nut 730. The aforementioned bosses serve to insulate conducting screw 725 from housing 201. Wire conductor 731 is attached to nut 730 with the net effect of transmitting power from connector contact 721 to the power input terminal of the power conversion unit (not shown). These features represent one of two such interfaces provided for each of the positive and negative contacts of the tool side connector. Importantly, bushing 728 is captive in housing 201, and nut 730 is captive in bushing 728 so that machine screw 725 may be removed or installed without needing access to the inside of power conversion unit 201. Further, the aperture 727A through housing 201 will have a typical "D" shape as will the engaging surfaces of bosses 727 and 729 so that the bosses inserted in the housing aperture will be immune to rotation. The recess in bushing 728 into which nut 730 seats will have a hexagonal shape so as to resist rotation of nut 730. The mechanism by which bushing 728 and nut 730 are held captive respectively may be one of any appropriate mechanisms such as press fit, ultrasonic welding, use of adhesive or bonding agents, etc. An insulating cover 724 is applied to cover the head of conducting screw 725 so that contact with outside materials that could result in short circuits are averted. As mentioned above, at least two of the screws mounting the one-piece field changeable tool side connector will be configured as in FIG. 7A so that the positive and negative contacts required are achieved. The other screws beyond the two initial conducting screws may be simple mechanical connections only or may provide redundant electrical connections implemented just as in 700A to augment the current carrying capability of the tool side connector to power conversion unit interface. Referring to FIGS. 7 and 7B, the former situation where two of the screws serve as conductors (one under insulating cap 724 and the other not shown) and two additional screws serve as mechanical connections only (both screws not numbered having no insulating caps depicted) is depicted.

FIG. 7B is an exploded illustration 700B similar to FIG. 7 illustrating a Makita battery 706 ready to be coupled to a corresponding one-piece field changeable tool side connector 701 affixed and adapted to power conversion unit 201. When battery 706 is installed the contacts within its battery side connector will interengage tool side connector contacts 721 and 722. The battery locking mechanism 706A will interengage battery retention feature 761 of the tool side connector.

Figure 7C:
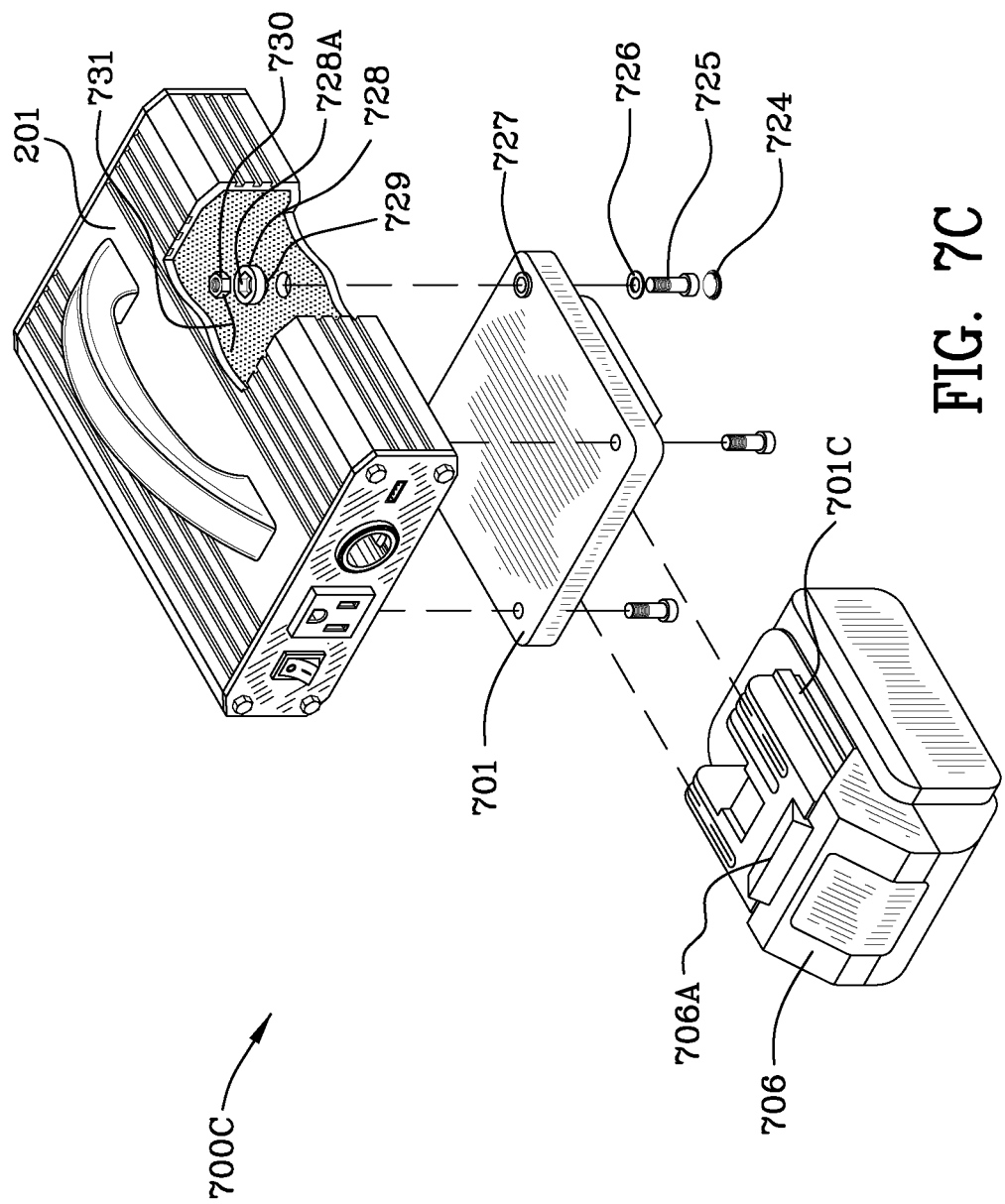
FIG. 7C is an exploded illustration showing a one-piece field changeable tool side connector being affixed to a power conversion unit via machine screws arranged in a standardized geometric pattern.

FIG. 7C is an exploded illustration 700C of a power conversion unit 201 and battery 706 indicating the adaptation of a one-piece field changeable tool side connector 701 to power conversion unit 201. Platform 701 of the tool side connector is presented in this view along with two unnumbered threaded screws which mechanically connect the platform to the power conversion unit housing. Also, a section of the interior of the power conversion unit 201 is illustrated showing further the example of FIG. 7A of the routing of the electrical energy into the interior of the power conversion unit 201. It should be noted that, although bushing 728 and nut 730 are shown separated from power conversion unit housing 201 in this view, in practice 728 and 730 will be permanently retained in said housing. Further, although the aperture in said housing is shown to be round, it will typically have a "D" shape or other feature to prevent rotation of bushing 728 and thus prevent rotation of nut 730. Also viewed in FIG. 7C is the Makita battery 706 and spring loaded lock 706. Reference numeral 701C indicates a mating surface which interengages surface 701B on the tool side connector shown in FIG. 7B.

Figure 7D:
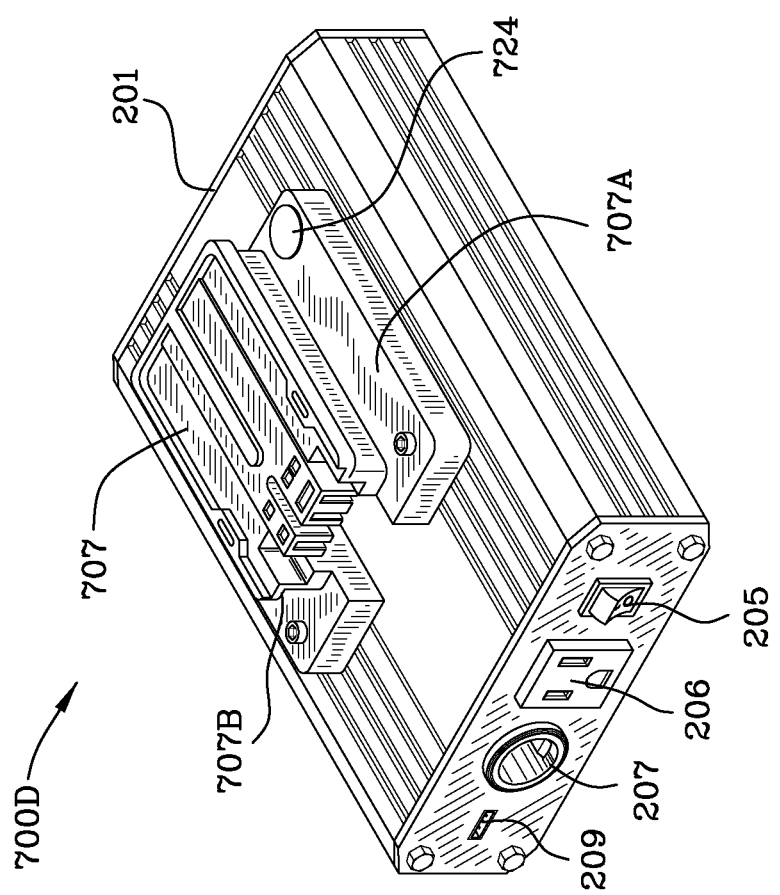
FIG. 7D is a view similar to FIG. 7B illustrating a second type of one-piece field changeable tool side connector affixed to a power conversion unit allowing a second type of battery to be used.
Figure 7E:
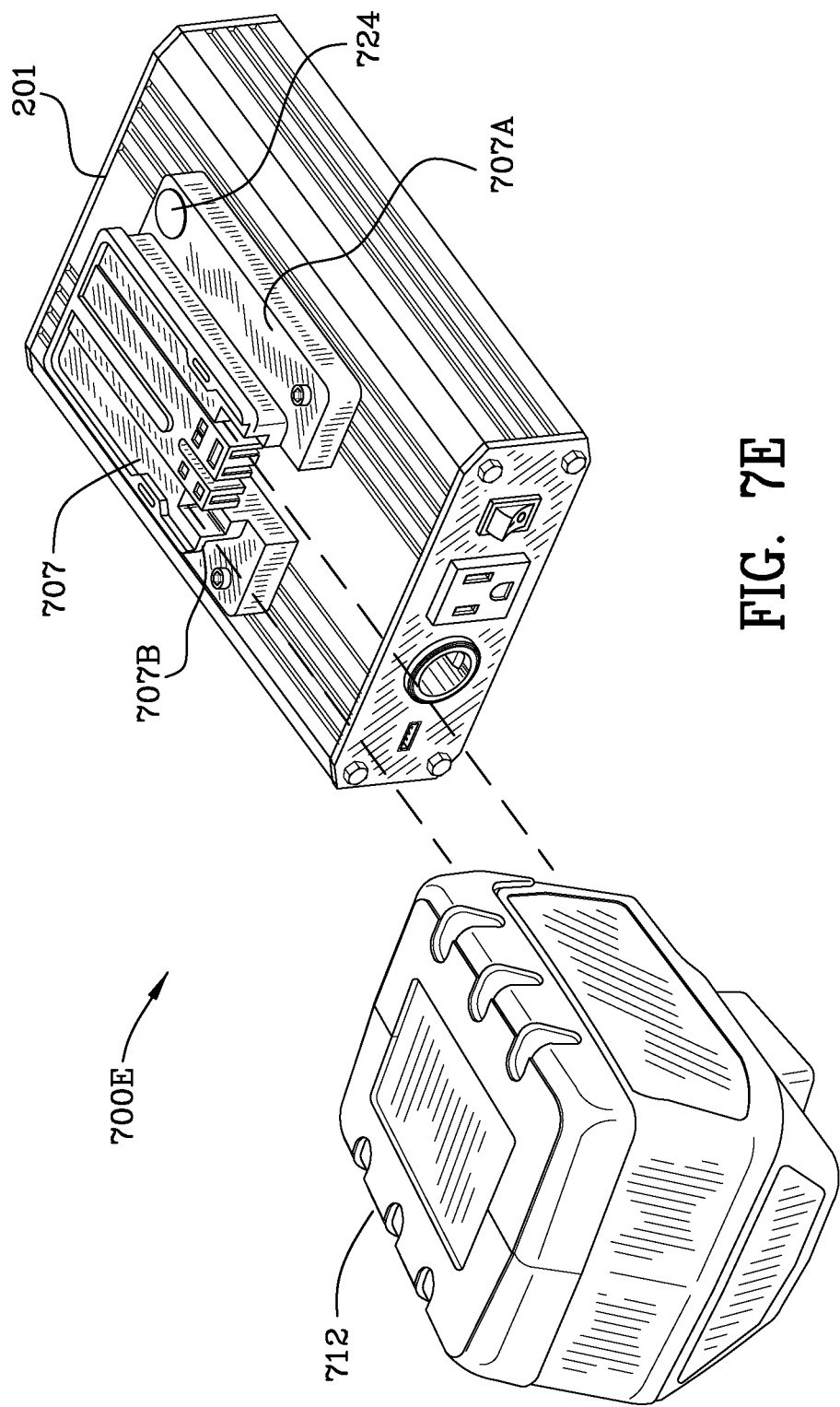
FIG. 7E is an exploded illustration similar to FIG. 7B illustrating a second style battery ready to be coupled to a one-piece field changeable tool side connector adapted and mounted to the power conversion unit set forth in FIG. 7D.
Figure 7F:
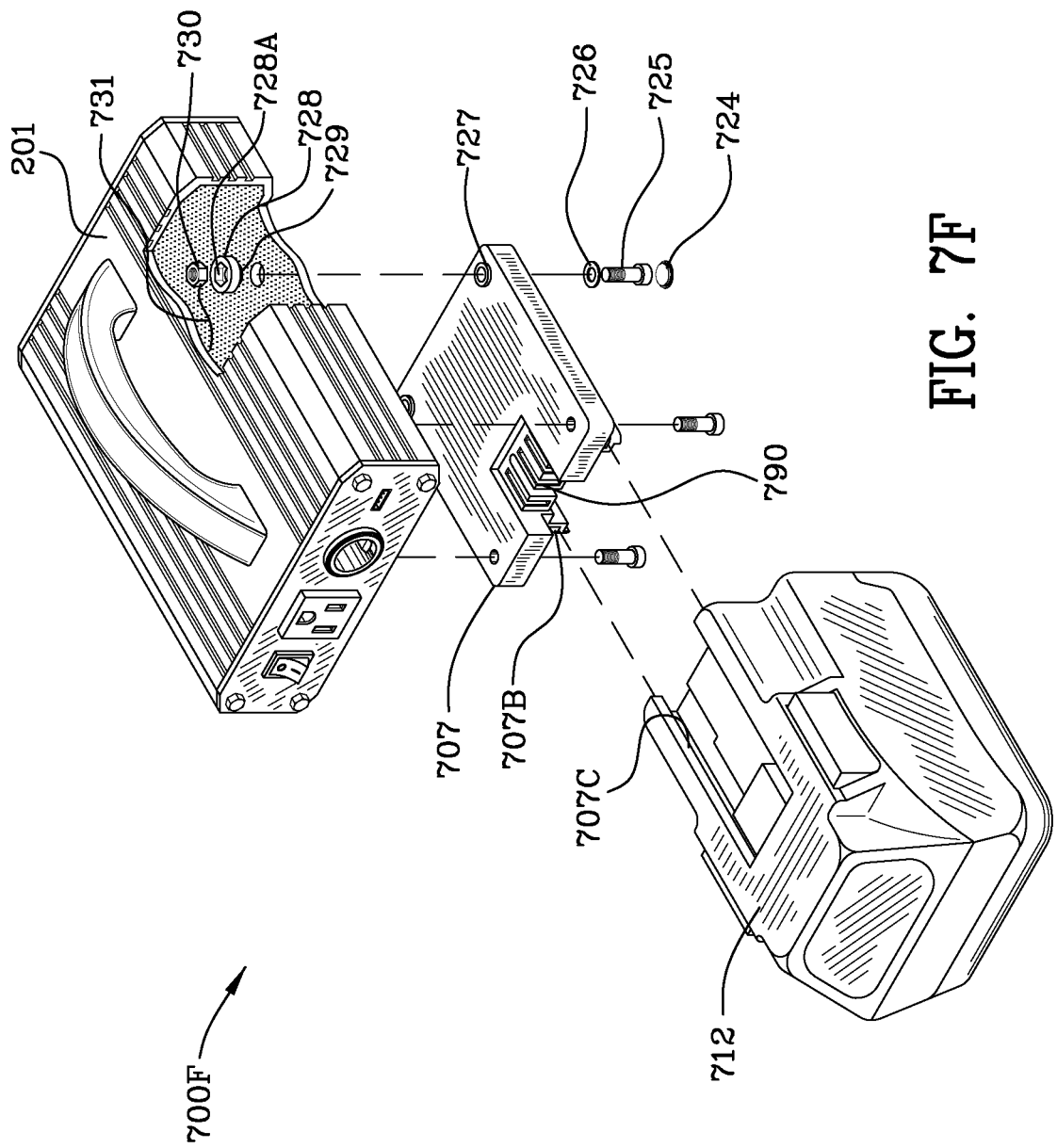
FIG. 7F is an exploded illustration showing the second type one-piece field changeable tool side connector being affixed to a power conversion unit via machine screws arranged in a second standardized geometric pattern.

FIG. 7D is a view 700D similar to FIG. 7B illustrating another one-piece field changeable tool side connector 707/707A adapted and mounted to a power conversion unit 201. Platform 707A is similar to the previously discussed platform 701A and is also preferably constructed of plastic or some other polymeric or hard rubber material which is an electrical insulator. Surface 707B mates with a Milwaukee 28 VDC lithium ion battery depicted in FIG. 7E. FIG. 7E is an exploded illustration 700E similar to FIG. 7B illustrating a Milwaukee 28 VDC lithium ion battery 712 ready to be coupled to a one-piece field changeable tool side connector adapted and mounted to the power conversion unit 201 set forth in FIG. 7D. FIG. 7F is an exploded illustration 700F of a power conversion unit 201, a Milwaukee battery 712, and an adaptation of a one-piece field changeable tool side connector 707/707A to the power conversion unit 201.

FIGS. 7-7F illustrate the situation of coupling a standard off the shelf cordless tool battery to a power conversion unit for the purpose of using a dual use battery to power a power conversion unit thus creating a cordless power supply. As illustrated above, however, the standard off the shelf cordless tool battery must be fitted to a tool side connector adapter 701/701A or 707/707A which has been designed specifically for the standard off the shelf cordless tool battery. Additionally, work presently underway by other manufacturers on other cordless tool batteries not yet in production are specifically within the scope of the invention. The advantages of the one-piece field changeable tool side connector depicted in 7-7F include its relative simplicity, the fact that a user can change from one tool side connector to another thusly adapting his power conversion unit for use with any electrically compatible battery with relative ease, and the fact that the attachment bolt pattern may be varied so that only tool side connectors compatible with batteries which in turn are compatible with a given power conversion unit may be successfully attached to that power conversion unit.

Another aspect of the invention set forth below in drawing FIGS. 7G-7K discloses the structure by way of example only for the use of a two-piece quick changeable tool side connector system interposed between the power conversion unit and the battery. Using any of the tool side connector strategies described herein above and below, users of standard off the shelf batteries may now use them not only for their cordless tool needs but also to supply their own power needs in the event of power outages, outdoor events, military needs in the field and the like. Frequently, a particular user of cordless tools will have batteries and tools made by several manufacturers. The two-piece quick changeable tool side connector system now described offers the most convenient and flexible way for the user to mix and match his different cordless tool batteries to his power conversion unit.

Figure 7H:
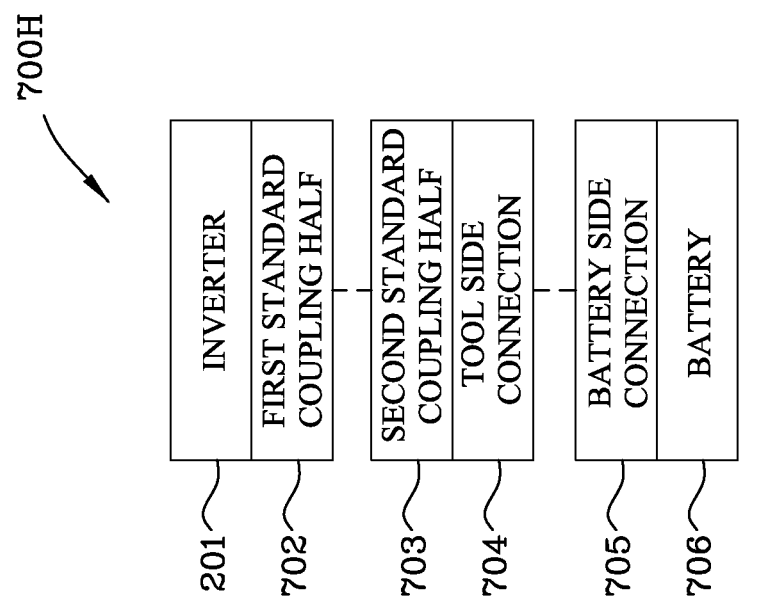
FIG. 7H is a schematic diagram of a first standard coupling half of a two-piece quick changeable tool side connector system affixed to a power conversion unit, a second standard coupling half of the aforementioned connector system affixed to or integral with an adaptation of a tool side connection, and a battery side connection of a cordless tool battery such that the battery may be mated via its battery side connection to the tool side connection of the second coupling half which in turn may be mated via its two-piece quick changeable connector system second coupling connection to the corresponding connection of the first coupling half of said connector system.
Figure 7G:
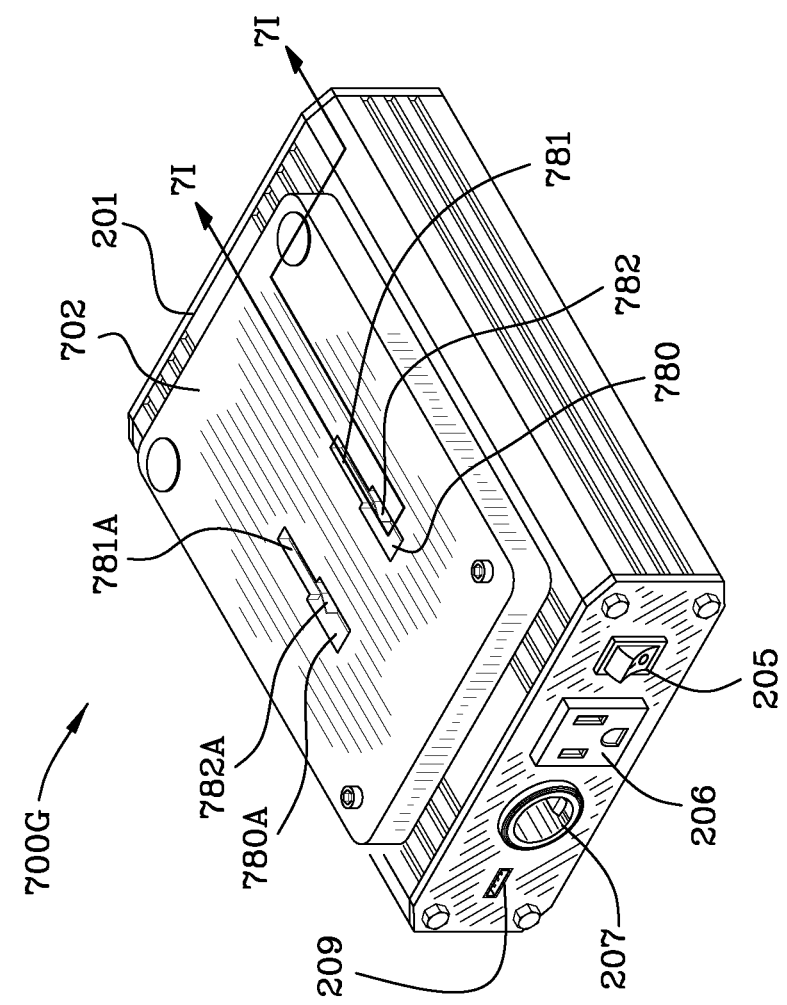
FIG. 7G is an illustration of a first standard coupling half of a two-piece quick changeable tool side connector affixed to a power conversion unit.

FIG. 7G is an illustration 700G of a first standard coupling half 702 of a two-piece quick changeable tool side connector system affixed to a power conversion unit 201. An enlarged slot 780 resides in the coupling half 702 and allows entrance to an enlarged head portion 789 of conductor 721 (shown in FIG. 7K). Referring to FIG. K, conductor 721 is secured within the second standard coupling half 703. It should be noted for second standard coupling half 703, the nomenclature standard refers to the side of the coupling that intermates with the first standard coupling half 702, and that the tool side connector of the second standard coupling half that intermates with the battery will be specific to each battery type. Thus there will be a second standard coupling half type for each cordless tool battery type and for each power conversion family type (perhaps only one type) compatible with that cordless tool battery. All second standard coupling halves will have an electrical conductor in plate form 721 which extend through the second standard coupling half protruding outwardly and terminating in an enlarged portion for mating with the first standard coupling half. In other words the second standard coupling will be standard insofar as a plate 721 being embedded within an insulator 703 and the plate will extend and protrude from the second standard coupling half and will terminate in a head 789. As stated above the fact that the plate 721—head 789 combination are standardized, that 721 can be quickly mechanically and electrically coupled with the first standard coupling half which in turn is mechanically and electrically coupled to the power conversion unit, and that the second standard coupling is available for any cordless tool battery compatible with a given power conversion unit, means the two-piece quick changeable tool side connector system is the most convenient for users who have multiple types of cordless tool systems and cordless tool batteries and would like to re-use their power conversion unit(s) with any of these batteries. Ideally the user need purchase just one power conversion unit and one second standard coupling half 703 for each battery type he would like to use.

Use of standard coupling halves 702, 703 enables the use of a single power conversion unit and multiple battery types. In the examples given above in regard to FIGS. 7-7F, power conversion units equipped with one-piece field changeable tool side connections must change over the tool side connector type by removing and reinstalling retaining screws in order to use different types of off the shelf cordless tool batteries compatible with their power conversion unit. The standard coupling halves of the two-piece quick changeable tool side connector system allow the user to quickly connect the second standard coupling half specific for a different battery to the first standard coupling half affixed to the power conversion unit, and then simply quickly connect his different battery to the tool side connection of the second standard coupling half so installed. Either the one-piece field changeable tool side connector or the two-piece quick changeable tool side connector system is less costly than purchasing a specific, permanent tool side connector equipped power conversion unit for each battery type whenever the user has more than one type of battery to use. Although the one-piece field changeable tool side connector allows the user to use different battery types by changing over the connector, the two-piece quick changeable tool side connector system allows this changeover of connectors to be easier and quicker. On the other hand, if the user does not need to vary the battery type used very often, the one-piece tool side connector may be a more economical approach.

One additional advantage of either the one-piece field changeable and two-piece quick changeable connector systems is that either may contain circuitry, in a way described for vehicle power adapters elsewhere, interposed between the battery and the power conversion unit, which may provide signal conditioning and or voltage step-up or step-down functions. In this way, the power conversion unit having a more narrow range of input voltage capability, say 18 volt to 24 volt range, might be used with a 12 volt battery if whichever tool side connector is used interposes a 12 volt to 20 volt step up stage between the battery and the power conversion unit. In the case of the one-piece field changeable system, such circuitry would exist physically within the connector body 701A and would be interposed electrically in series with wire conductor 723 (FIG. 7A). In the case of the two-piece quick changeable system, such circuitry would exist physically within the connector body 702 and would be interposed electrically in series with wire conductor 723 (FIG. 71).

In further description of the mechanism by which the first and second standard coupling halves of the two-piece quick changeable tool side connector system mechanically and electrically connect with one another, referring further to FIG. 7J, conductors 721/722 are embedded and held within the second standard coupling half 703. Referring to FIG. 7K, enlarged head portions 789, 789A of plates 721, 722, respectively, are placed within enlarged slots 780, 780A (FIG. 7G) respectively, and engaging clips 782, 782A and then they are urged under lips 781, 781A which prevent vertical extraction of the second standard coupling half 703 therefrom. Additionally, clips 782, 782A are spring loaded and resist the movement of the enlarged heads back toward the enlarged slots 780, 780A. Clips 782, 782A are electrically interconnected by conductor 723 so as to provide electrical power to the electrical circuitry of the power conversion unit (not shown).

The foregoing described mechanism by which first and second standard coupling halves intermate represents one example only. It should be clear to those skilled in the art that many alternative mechanisms are possible. For example, any mechanism currently in practice with cordless tools, such mechanism serving to mechanically and electrically interlock a cordless tool with its cordless tool battery, could be re-utilized as a mechanism for interfacing the first and second standard coupling halves themselves. Further although examples described herein utilize two power interconnection terminals in the coupling mechanism it should be clear that three or more terminals may be included whenever advantageous or required. For example, existing cordless tool batteries may provide a third terminal connected to a temperature sensor within the battery and it may be advantageous to connect this temperature sensor through the cordless power supply coupling mechanism to the power conversion unit.

FIG. 7H is a schematic diagram 700H of a first standard coupling half 702 affixed to a power conversion unit 201, a second standard coupling half 703 affixed to or integral with an adaptation of a tool side connection of a cordless tool or other appliance 704, and a battery side connection 705 of a cordless tool battery. The battery side connection is mated with the tool side connection 704 and the first and second standard coupling halves 702, 703 are mated together.

Figure 7I:
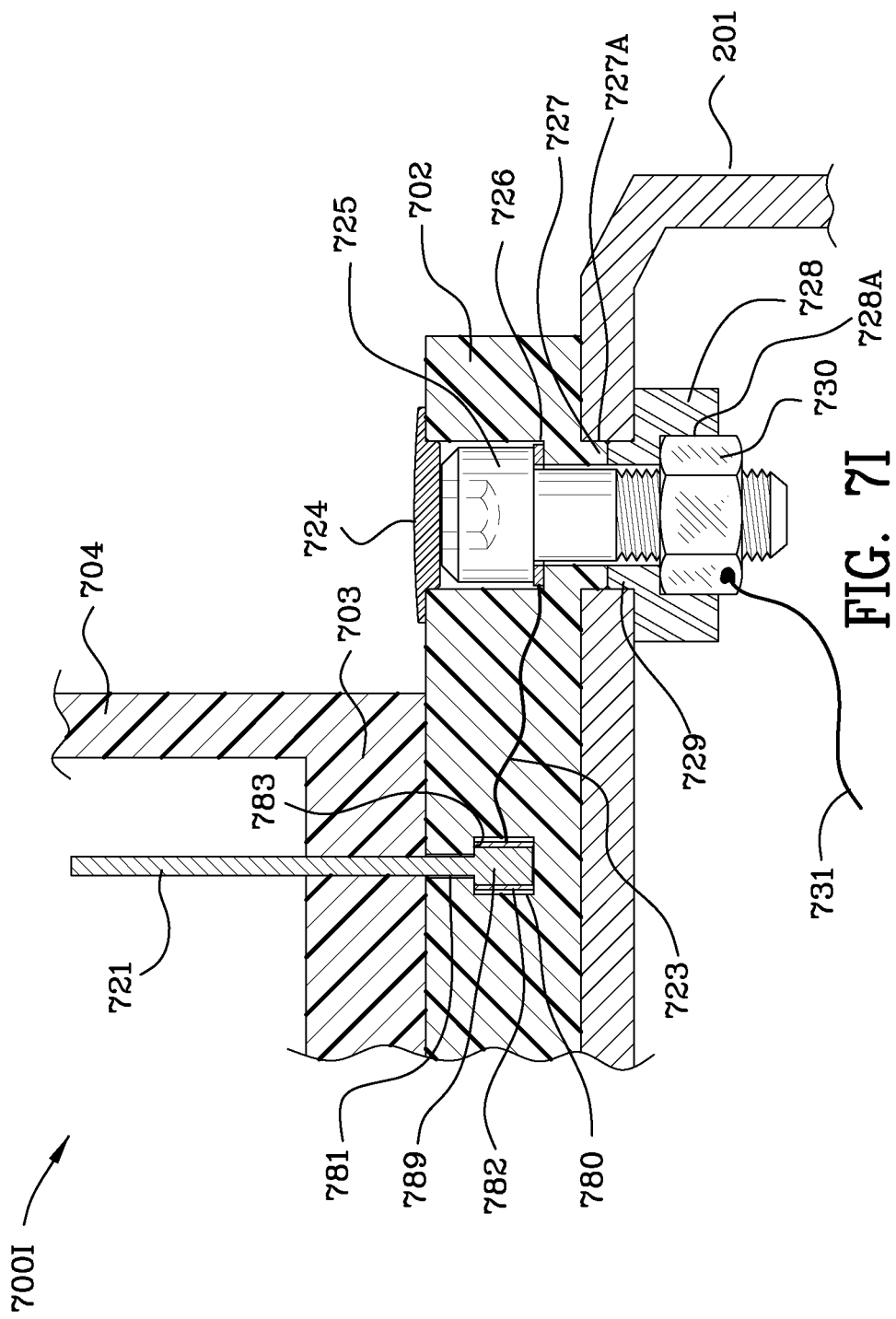
FIG. 7I is a cross-sectional illustration of a two-piece quick changeable tool side connector system showing the second standard coupling half affixed to the first standard coupling half; the first standard coupling half affixed both mechanically and electrically via machine screws in a standard geometric pattern to a power conversion unit. Additionally, the tool side connection is illustrated as being integral with the second standard coupling half.
Figure 7K:
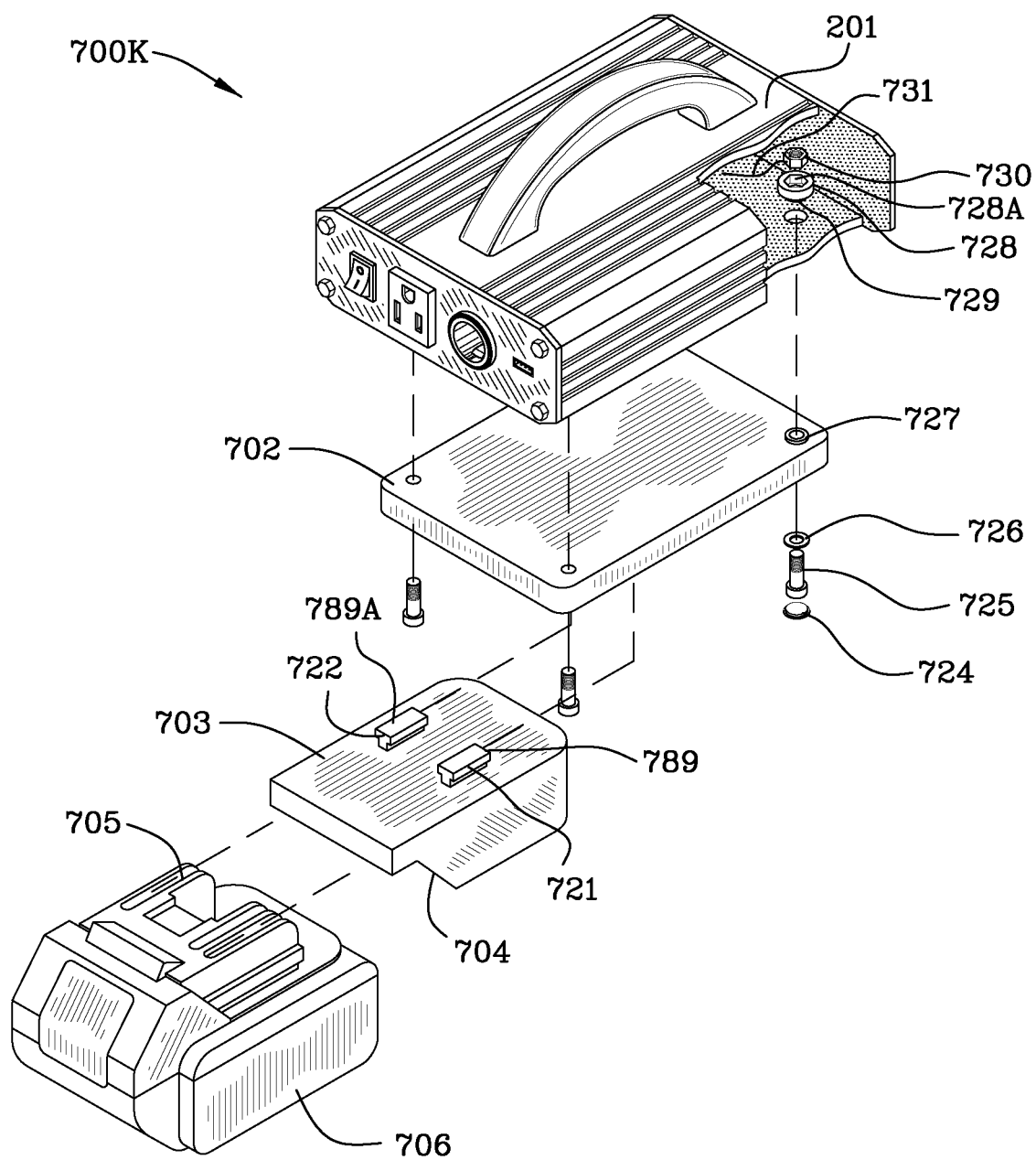
FIG. 7K is an exploded illustration similar to the view depicted in FIG. 7J viewed from another side of the invention.

FIG. 7I is a cross-sectional illustration 700I of a second standard coupling half 703 affixed to the first standard coupling half 702 which in turn is affixed using a method described elsewhere in detail for FIG. 7A to the power conversion unit 201. Additionally, the tool side connection 704 is illustrated as being integral with the second standard coupling half 703.

FIG. 7J is an exploded illustration 700J of a first standard coupling half 702 affixed to a power conversion unit 201, a second standard coupling half 703 shown integral with a tool side connection half 704 and a Makita battery 706 shown with battery connection side not visible positioned for engagement with the tool side connection half 704.

FIG. 7K is an exploded illustration 700K similar to the view depicted in FIG. 7J from another side of the invention. FIG. 7K illustrates the standard coupling half 703 from another perspective. Conductors 721, 722 and enlarged head portions 789, 789A are viewed as extending from the flat bottom surface (unnumbered) of second standard coupling half 703. Conductor 723 emanates from the bottom side of the first coupling half 702 where it may be fed through the aperture as previously discussed for FIG. 7A above to supply power to the power conversion unit.

Figure 7L:
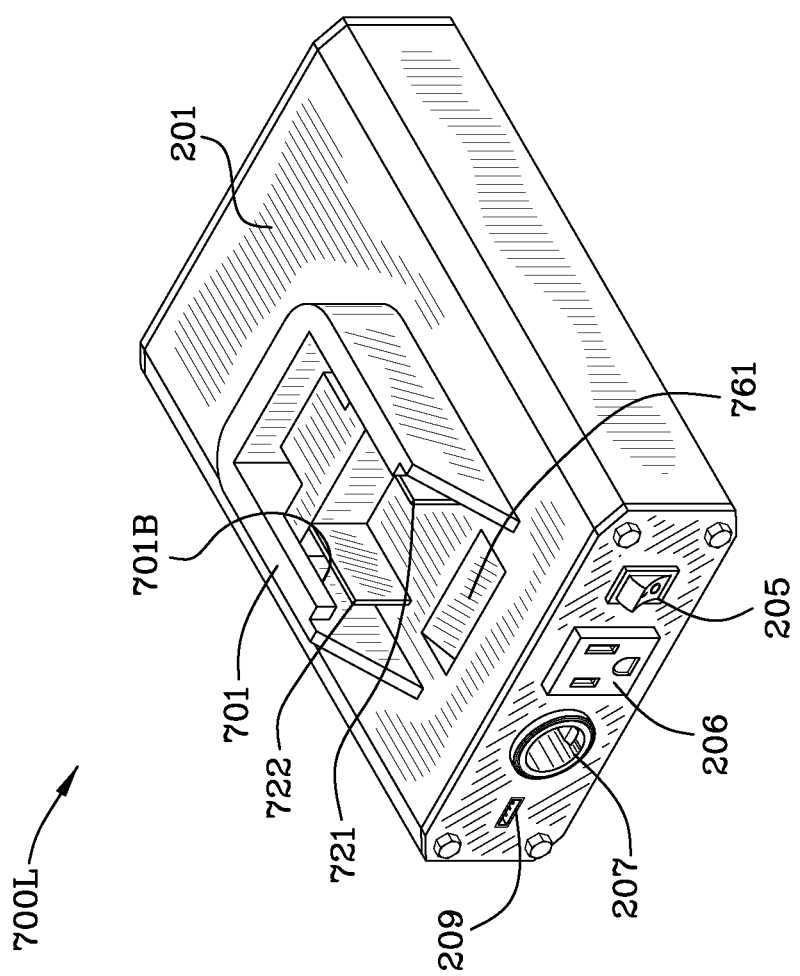
FIG. 7L is an illustration of a permanent tool side connector integrally combined with the housing of a power conversion unit.
Figure 7M:
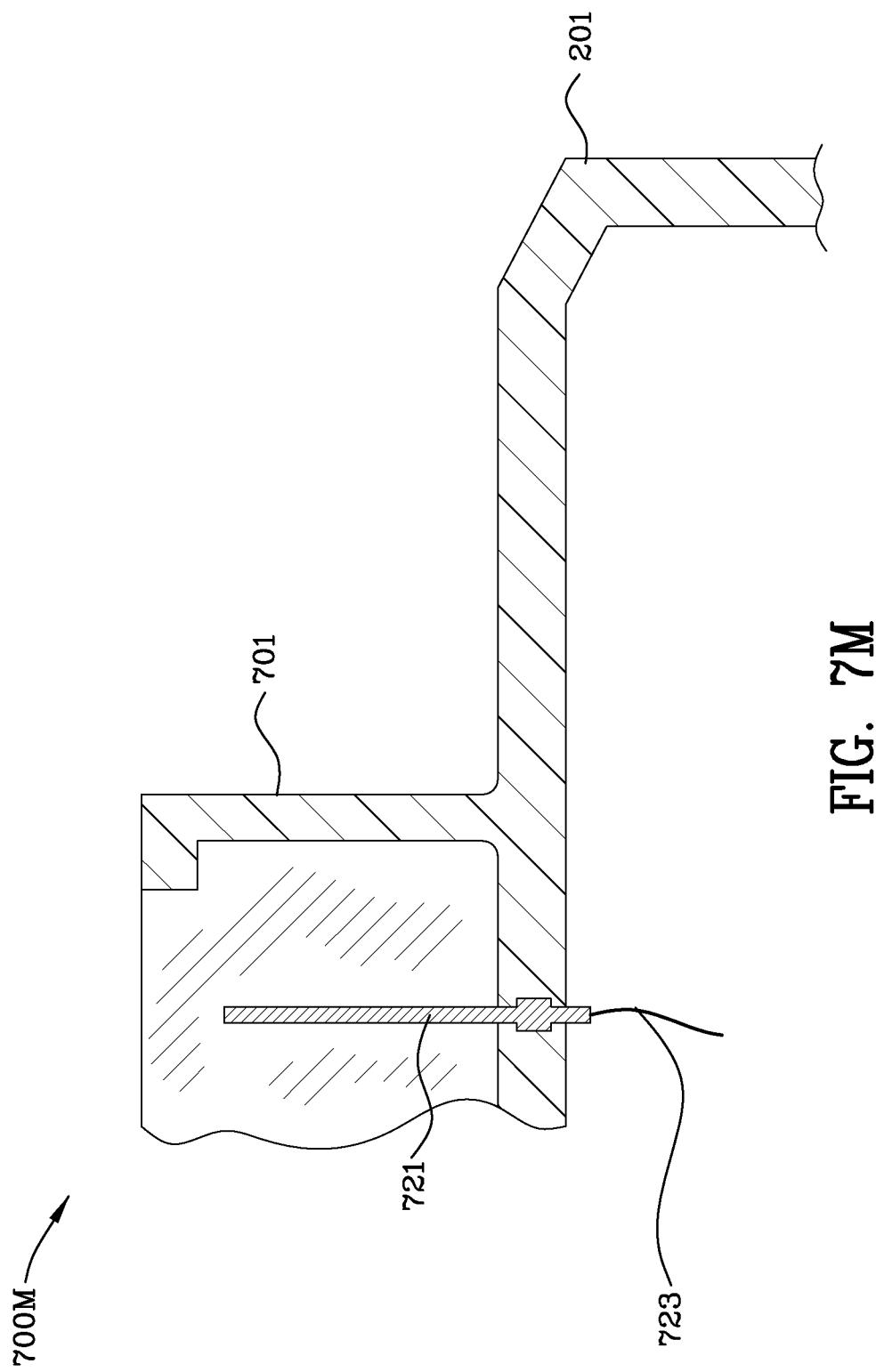
FIG. 7M is a cross-sectional illustration of the permanent tool side connector and power converter unit housing shown previously in FIG. 7L.

FIG. 7L depicts illustration 700L wherein the simplest form of tool side connector adaptation, the one where the tool side connector is permanently affixed and integral with to the power conversion unit, is depicted. In the example of FIG. 7L, the tool side connector for the Makita cordless tool battery 701 is molded integrally with the power conversion unit housing 201. Contacts of the tool side connector 721, 722 will electrically engage the battery when it is inserted. Detent depression 761, also integral with the power conversion unit housing, will engage the battery locking mechanism 706A. FIG. 7M reveals illustration 700M which is a cross-sectional view indicating the integral nature of tool side connector 701 and power conversion unit housing 201. In this view exemplary tool side electrical contact 721 may pass directly to the inside of power conversion unit housing where wire conductor 723 may be used to route current to the power inputs of the conversion unit (not shown). It will be apparent to those skilled in the art that many options exist for using various insulating and conducting materials in combination to mold or assemble the tool side connection in a way that permanently integrates it with the power conversion unit housing. The example shows one simple embodiment wherein the power conversion unit housing and tool side connector body are made of a monolithic electrically insulating material and should not be considered as limiting in light of many sensible alternative constructions.

FIG. 8 is an illustration 800 of a vehicle power adapter used for attachment to an automobile battery to be used for powering a power conversion unit. In the illustration, conductive clips 430, 431 will be color coded or otherwise labeled to identify their respective attachment to the vehicle positive and negative battery terminals respectively. Cable conductors 206 in turn lead to a battery side connector adapter 801. The battery side connector adapter may be chosen by the user to mimic one of the cordless tool batteries normally in use with the power conversion unit. In this way, the user may substitute the vehicle power when convenient for the cordless tool battery normally used with his cordless power supply.

FIG. 8A showing illustration 800A is an alternative form of vehicle power adapter, similar to the adapter 800 differing only in the vehicle side connector style. In this case, 800A uses a vehicle accessory power plug (cigarette lighter style) 802 to connect with the vehicle power system via the mating socket. It will be apparent to those skilled in the art that many different types of vehicle side connector options exist for various civilian and military, land, marine, or airborne vehicles. It is the intent of the present invention to include all such vehicle power adapters having vehicle side connectors to mate with any known vehicle power system.

Figure 7N:
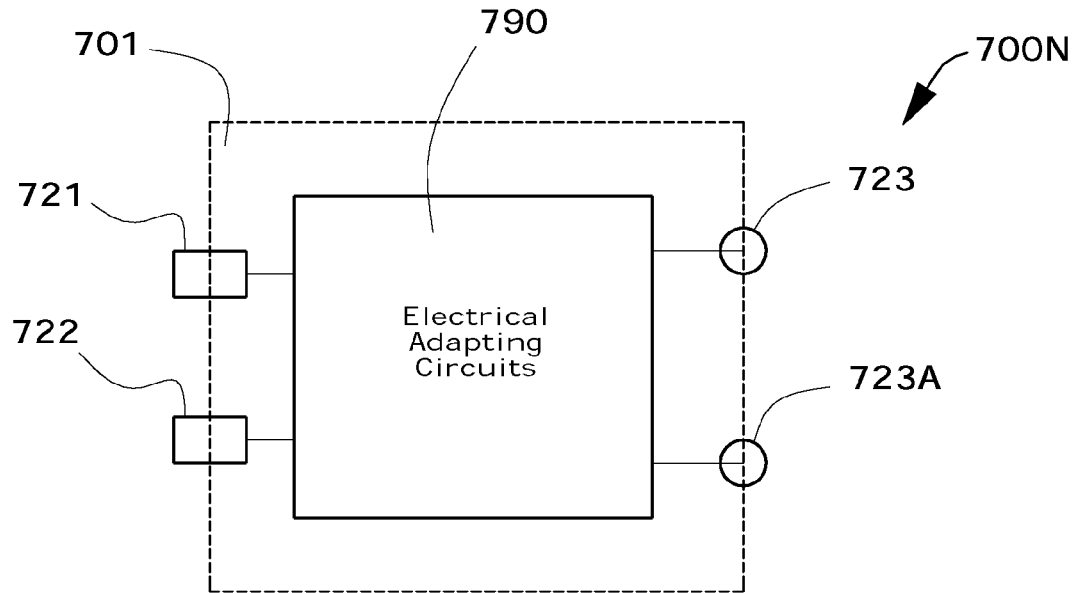
FIG. 7N is a schematic diagram of field changeable tool side connector showing optional electrical adapting circuits.

FIG. 7N is schematic diagram 700N of a field changeable tool side connector 701 showing optional electrical adapting circuits 790. The optional electrical adapting circuits 790 include all circuits for conditioning or processing electric currents, voltages and signals, for example, dc to dc conversion circuits and voltage regulator circuits of any type or topology.

Figure 7P:
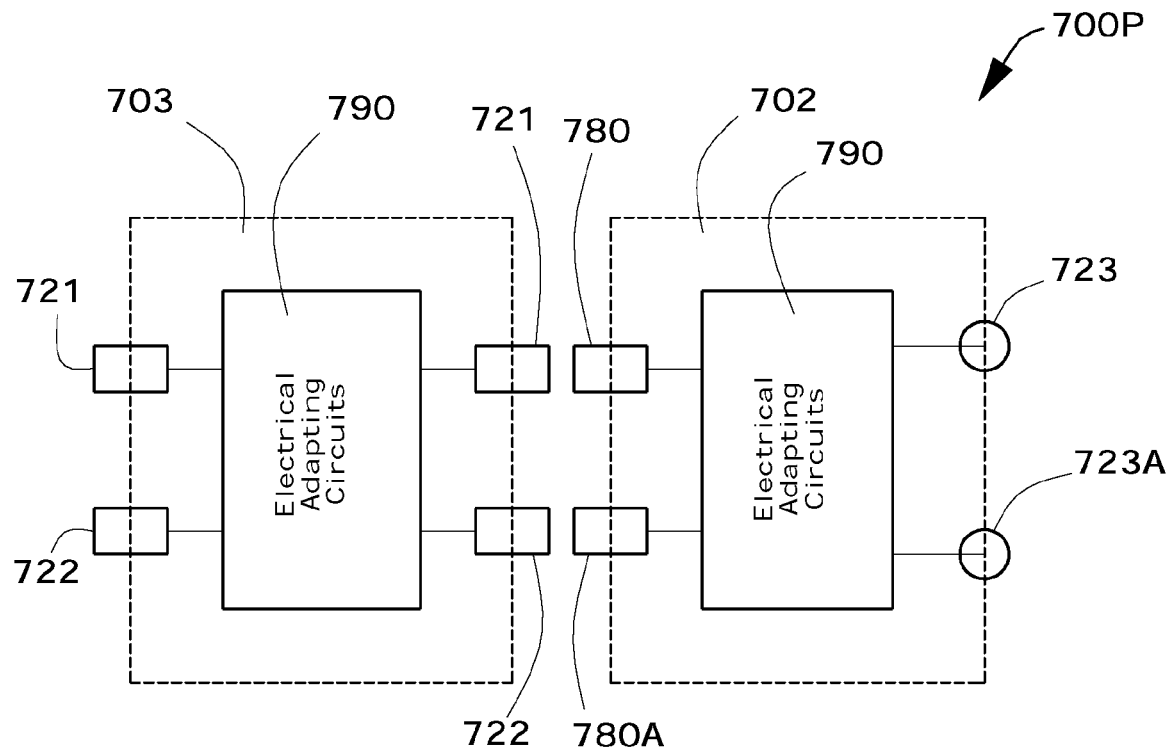
FIG. 7P is a schematic diagram of first and second standard coupling halves showing optional electrical adapting circuits.

FIG. 7P is a schematic diagram of first 702 and second 703 standard coupling halves showing optional electrical adapting circuits 790.

Figure 8B:
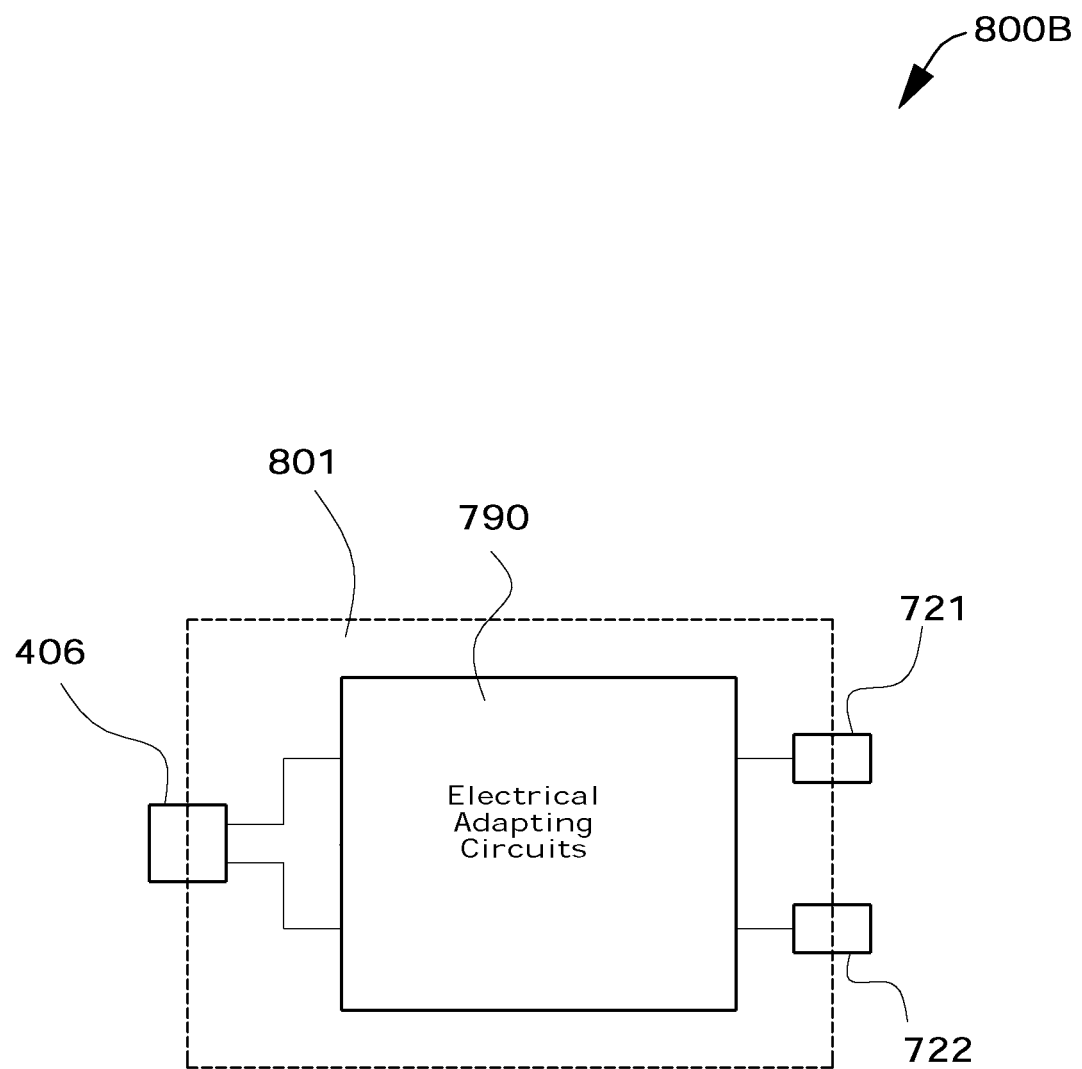
FIG. 8B is a schematic diagram of battery side connector of vehicle power adapter showing optional electrical adapting circuits.

FIG. 8B is a schematic diagram 800B of battery side connector of vehicle power adapter showing optional electrical adapting circuits.

As described above, it is possible that the vehicle power adapter 801, first 702 and second 703 coupling halves may include electrical adapting circuitry 790 to condition or provide voltage step-up or step-down as part of its functions in adapting vehicle power to a given power conversion unit. This electrical adapting circuitry 790 may be physically placed anywhere along the vehicle power adapter, including the vehicle side connector body, as a separate module in series with cable 406, 421, etc., or the battery side connector body 801.

Also as described above, anywhere a power conversion unit with two or more tool side connector inputs is used so that two or more batteries may be used concurrently for added power and energy, then two or more vehicle power adapters may be used for added power and energy. This may be very beneficial when running higher power loads from several current-limited vehicle power adapters. Also, it is possible to use batteries and vehicle power adapters in any combination with any compatible multiple input power conversion unit. In this way certain powered device loads that may require energy beyond what either vehicle power or battery power could source alone might be accommodated.

Figure 9:
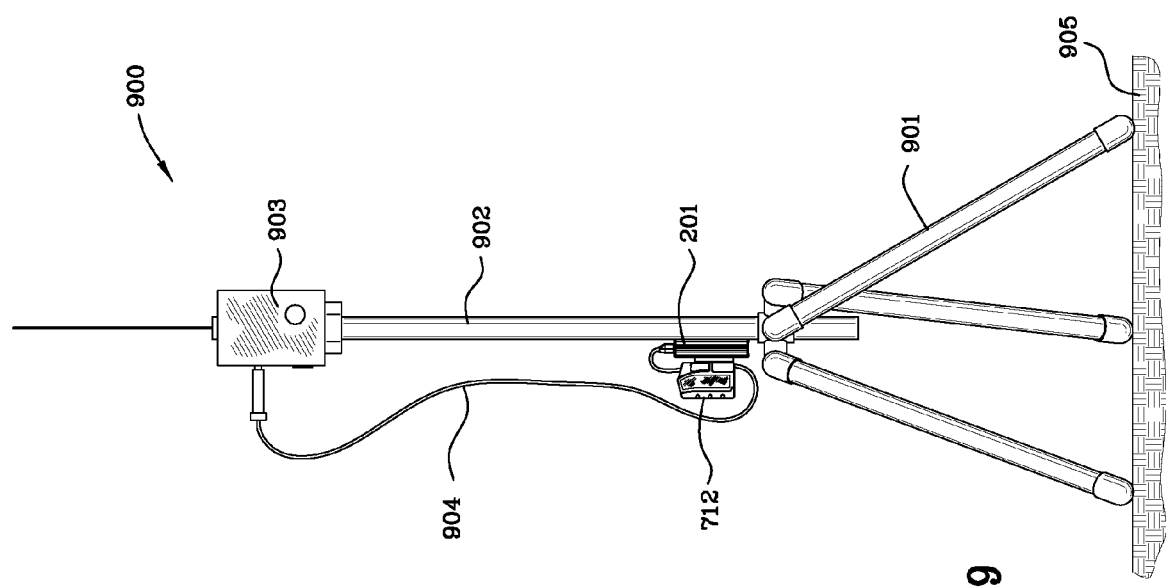
FIG. 9 is an illustration of the environment of one of the cordless power supplies mounted to a mast for powering a wireless network radio also attached to said mast.

FIG. 9 is an illustration 900 of the environment of one of the cordless power supplies mounted to a mast 902 for powering a signal transceiver 903. Tripod 901 supports mast 902 atop which is mounted transceiver 903. The cordless power supply comprising power conversion unit 201 and battery 712 supply power in conductor 904 to the transceiver 903.

LIST OF REFERENCE NUMERALS

100—illustration of a cordless power supply
100A—illustration of cordless power supply charging a battery
100B—illustration of a cordless power supply having two batteries
101—power conversion unit
102, 102A—battery
103—appliance
104—appliance power cord
105—on/off switch
106—alternating current outlet
107—direct current outlet
108—attachment of battery to power conversion unit
109—direct current outlet, i.e., a USB port
111—handle for the cordless power supply
170—cord for supplying a battery charger
171—battery charger
200—illustration of cordless power supply with dual batteries
200A—illustration of cordless power supply with single battery
201—power conversion unit
202, 202A, 203A—battery
202L—spring loaded battery lock
204—power supply cord for a laptop computer
205—on/off switch
206—alternating current outlet
207—direct current outlet
208—attachment of battery to power conversion unit
209—direct current outlet, i.e., a USB port
210—laptop computer
211—handle for the cordless power supply
300—illustration of cordless power supply charging a cell phone and a laptop computer
301—power cord for a cell phone
302—cell phone 400—illustration of a cordless power supply being powered by an automobile battery and simultaneously charging a battery
400A—illustration of a cordless power supply being powered by an automotive accessory power outlet on the dash of an automobile
401—automobile battery
402—positive battery cable
403—negative battery cable
404—negative battery terminal
405—positive battery terminal
406—cable leading from the battery to the battery side connector connected to power conversion unit 407
407—power conversion unit
408—battery side connector of vehicle power adapter
409—cable interconnecting the power conversion unit 407 to the charger
410—charger
411—battery
420—dashboard
421—electrical interconnection between outlet/receptacle 422B and battery side connector of the vehicle power adapter
421A—electrical interconnection between outlet/receptacle 422A and battery side connector of the vehicle power adapter
422A—first power outlet/receptacle on dash 420
422B—second power outlet/receptacle on dash 420
423—battery cable leading from the positive terminal to current limiting device 440
430—positive battery connector clamp of vehicle side connector of vehicle power adapter
431—negative battery connector clamp of vehicle side connector of vehicle power adapter
433—ground or common of overall vehicle electrical system
440—current limiting devices in series with vehicle battery and accessory power outlets
441—electrical interconnection between current limiting device 440 and first direct current outlet/receptacle 422A on dashboard 420
442—electrical interconnection between current limiting device 440 and second direct current outlet/receptacle 422B on dashboard 420
500—illustration of an automobile battery supplying power to outlets/receptacles on a dash board of an automobile which in turn supplies power to a power conversion unit which in turn supplies power to a charger
501—power conversion unit of cordless power supply
502—vehicle adapter battery side connector
503—vehicle adapter battery side connector side connector
600—illustration similar to the illustration denoted by reference numeral 500 additionally supplying power to an MP3 player.
604—electrical interconnection to IPOD, a registered trademark of Apple Computer, Inc., 610
610—IPOD, a registered trademark of Apple Computer, Inc.,
700—illustration of a power conversion unit with a one-piece field changeable tool side connector affixed thereto
700A—cross-sectional view of cordless power supply with one-piece field changeable tool side connector
700B—exploded view of the cordless power supply
700C—exploded view of the cordless power supply
700D—another illustration of a power conversion unit with a one-piece field changeable tool side connector affixed thereto
700E—exploded view of the cordless power supply
700E—exploded view of the cordless power supply
700G—perspective view of a power converter unit with first standard coupling half of a two-piece quick changeable tool side connector system affixed thereto
700H—schematic diagram of the two-piece quick changeable tool side connector system showing use of first and second standard coupling halves to mate various batteries to a power conversion unit
700I—cross-sectional view of first and second standard coupling halves mated together
700J—exploded perspective view of a power conversion unit, first standard coupling half and second standard coupling half of the two-piece quick changeable tool side connector system, and battery
700K—exploded perspective view of a power conversion unit, first standard coupling half and second standard coupling half of the two-piece quick changeable tool side connector system, and battery
700L power conversion unit with integral permanent tool side connector
700M—cross-sectional view of power conversion unit with integral permanent tool side connector
700N—schematic diagram of field changeable tool side connector showing optional electrical adapting circuits
700P—schematic diagram of first and second standard coupling halves showing optional electrical adapting circuits
701—body of one-piece field changeable tool side connector with quick disconnect tool side coupling integral with platform 701A, or body of permanent tool side connector housing integral with power conversion unit housing 201
701A—platform affixed to the power conversion unit 201
701B—engaging surface adapted to receive a battery having a corresponding surface
701C—surface on battery 706 for interengaging surface 701B
702—first standard coupling half
703—second standard coupling half
704—tool side coupling half which is affixed to the second standard coupling half
705—battery side coupling half
706—battery pack
706A—battery lock
707—one-piece field changeable tool side connector with quick disconnect tool side coupling integral with platform 707A
707A—platform affixed to the power conversion unit 201
707B—engaging surface adapted to receive a battery having a corresponding surface
707C—surface on battery 707C for interengaging surface 701B
712—battery
721—power interconnection
722—power interconnection
723—electrical conductor from contact 721 to conductive washer contacting machine screw contacting conductive nut with wire lead to power conversion unit input
723A—electrical conductor from contact 722 to washer contacting machine screw contacting conductive nut with wire lead to power conversion unit input
724—insulating cover
725—head of electrically conductive screw
726—conductive washer
727—insulating boss of first standard coupling half
727A—aperture in cover of power conversion unit 201
728—captive insulating bushing
728A—hexagonal socket in insulating bushing 728 for preventing rotation of nut 730
729—insulting boss on insulating bushing 730—nut on machine screw 725
731—wire conductor leading from conductive nut to power conversion unit power input
761—engaging depression for battery lock 706A
780—enlarged opening in first standard coupling half 702
780A—enlarged opening in first standard coupling half 702
781—narrowed slot in first standard coupling half 702
781A—narrowed slot in first standard coupling half 702
782—spring-loaded retaining clip and electrical contact in first standard coupling half
782A—spring-loaded retaining clip and electrical contact in first standard coupling half
789—enlarged locking head of power interconnection 721
789A—enlarged locking head of power interconnection 722
790—electrical adapting circuits
800—perspective view of direct battery connect type vehicle power adapter
800A—perspective view of accessory power outlet type vehicle power adapter
800B—schematic diagram of battery side connector of vehicle power adapter showing optional electrical adapting circuits
801—battery side connector of vehicle power adapter
802—vehicle side connector of the cigarette lighter type of a vehicle power adapter.
900—view of one environment for using a cordless power supply
901—tripod supporting a cordless power supply mounted on mast 902
902—mast
903—transceiver
904—electrical connection for supplying power from the cordless power supply to the transceiver The invention has been set forth with particularity by way of example. Those skilled in the art will readily recognize that changes may be made to the examples as shown without departing from the spirit and the scope of the appended claims.

The invention claimed is:

1. A cordless power supply, comprising:
a power source and a power conversion unit;
said power source releasably coupled to said power conversion unit with a quick disconnect fitting;
said quick disconnect fitting comprising first and second coupling halves; said first coupling half affixed to said power conversion unit; said first coupling half intermatable with said second coupling half; and, said second coupling half being integral with said power source;
said first and second halves of said quick disconnect fitting being coupled or uncoupled;
said first coupling half including second coupling half engaging surfaces having first electrical conductors for communicating electrical power and/or information between said second coupling half engaging surfaces and said power conversion unit;
said second coupling half including first coupling half engaging surfaces having second electrical conductors for communicating electrical power and/or information between said first coupling half engaging surfaces and said power source;
such that, when coupled, said first and second coupling halves allow electrical power and/or information to be communicated between said power conversion unit and said power source.

2. A cordless power supply as claimed in claim 1 wherein said power source is a direct current power source and said power conversion unit converts direct current.

3. A cordless power supply as claimed in claim 2 wherein said first coupling half is an integral part of said power conversion unit.

4. A cordless power supply as claimed in claim 2 wherein said first coupling half is affixed to said power conversion unit by removable fasteners allowing a plurality of configurations of first coupling halves to be interconnected with said power conversion unit.

5. A cordless power supply as claimed in claim 1, wherein:
said first coupling half with said power conversion unit affixed thereto is interengageable with said second coupling half;
said first coupling half includes first longitudinal alignment surfaces, said second coupling half includes second longitudinal alignment surfaces;
said first electrical conductors of said first coupling half include a first power interconnection and a second power interconnection;
said second electrical conductors of said second coupling half integral with said power source includes a first electrical receptacle and a second electrical receptacle;
said first coupling half includes a mating catch and said second coupling half includes a biased latch; and, during coupling:
said first longitudinal alignment surfaces of said first coupling half and said second longitudinal alignment surfaces of said second coupling half slidingly interengage each other preventing vertical and lateral separation of said first and second coupling halves;
said first power interconnection of said first electrical conductors of said first coupling half slidingly interengages said first electrical receptacle of said second electrical conductors of said second coupling half, said second power interconnection of said first electrical conductors of said first coupling half slidingly interengages said second electrical receptacle of said second electrical conductors of said second coupling half;
said sliding of said first longitudinal alignment surfaces with respect to said second longitudinal alignment surfaces and said sliding of said first and second power interconnections with respect to said first and second electrical receptacles continues until said mating catch of said first coupling half interengages said biased latch of said second coupling half; and,
said interengagement of said mating catch and said biased latch preventing longitudinal separation of said first and second coupling halves.

6. A cordless power supply as claimed in claim 4, wherein one or more of said fasteners is made of an electrically conductive material and electrically connects one or more of said second coupling half engaging surfaces of said first coupling half with said power conversion unit, said fasteners simultaneously mechanically and electrically connect said first coupling half, one or more second coupling half engaging surfaces of said first coupling half, and said power conversion unit.

7. A cordless power supply as claimed in claim 1 wherein said first coupling half comprises adapting circuitry interposed between said second coupling half engaging surfaces and said electrical conductors.

8. A cordless power supply as claimed in claim 1 wherein said power source is a cordless tool battery pack.

9. A cordless power supply as claimed in claim 1 wherein said power source is a power adapter comprising a second coupling half compatible with said first coupling half, an electrical cable, said cable connects to a second power source and conveys electrical power and/or information from said second power source to said second coupling half, said first coupling half, and said power conversion unit.

10. A cordless power supply as claimed in claim 9 wherein said power adapter comprises power adapting circuitry interposed between said electrical cable and said second coupling half.

11. A cordless power supply as claimed in claim 1 wherein said power source is a battery.

12. A process for coupling a power source to a power conversion unit, comprising:
   a step for mounting a first coupling half to said power conversion unit;
   a step for establishing electrical communication between said first coupling half and said power conversion unit; and,
   a step for coupling a second coupling half to said first coupling half, said second coupling half interconnected with a power source, and establishing electrical communication between said first coupling half, said second coupling half, said power source, and said power conversion unit.

13. A process for coupling a power source to a power conversion unit as claimed in claim 12 wherein said steps for mounting a first coupling half to said power conversion unit and establishing electrical communication between said first coupling half and said power conversion unit further comprises:
   a step for mounting a first intermediate coupling half to said power conversion unit;
   a step for establishing electrical communication between said first intermediate coupling half and said power conversion unit; and,
   a step for coupling a second intermediate coupling half to said first intermediate coupling half establishing electrical communication between said first and second intermediate coupling halves, and, the combination of said first and second intermediate coupling halves function together as said first coupling half.

14. A process for coupling a power source to a power conversion unit as claimed in claim 13 further comprising:
   a step for removing said first coupling half from said power conversion unit and re-mounting another first coupling half to said power conversion unit.

15. A process for coupling a power source to a power conversion unit as claimed in claim 12 wherein said power source is a cordless tool battery.

16. A process for coupling a power source to a power conversion unit as claimed in claim 12 wherein said power source is a power adapter comprising a second coupling half compatible with said first coupling half, an electrical cable, said cable connects to a second power source and conveys electrical power and/or information from said second power source to said second coupling half, said first coupling half, and said power conversion unit.

17. A cordless power supply, comprising:
   a power conversion unit;
   a first coupling half and a second coupling half;
   said first coupling half comprises a female component and a male component;
   said female component of said first coupling half includes electrical receptacles therein;
   electrically conducting fasteners affix said female component of said first coupling half to said power conversion unit;
   said electrical receptacles of said female component of said first coupling half being in electrical communication with said electrically conducting fasteners;
   said male component includes male electrical conductors protruding therefrom which intermate with said electrical receptacles of said female component coupling said male and female components together;
   said male component of said first coupling half further includes female receiving surfaces;
   a second coupling half, said second coupling half being integral with a power supply, said second coupling half includes male engaging surfaces; and,
   said male engaging surfaces of said second coupling half interengaging said female receiving surfaces of said female component of said first coupling half.

18. A cordless power supply as claimed in claim 17 wherein said power supply is a direct current power supply and said power conversion unit converts direct current to alternating current.

19. A cordless power supply as claimed in claim 17 wherein said power supply is a battery.

* * * * *